(12) United States Patent
Widenbrant et al.

(10) Patent No.: US 11,512,463 B2
(45) Date of Patent: Nov. 29, 2022

(54) AIR AND WATER BARRIER ARTICLE WITH POROUS LAYER AND LINER

(71) Applicant: 3M INNOVATIVE PROPERTIES COMPANY, St. Paul, MN (US)

(72) Inventors: Martin J. Widenbrant, Stillwater, MN (US); Taylor M. Seabaugh, Stanford, CA (US); Daniel R. Fronek, Woodbury, MN (US); Rajan B. Bodkhe, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/753,444

(22) PCT Filed: Aug. 18, 2016

(86) PCT No.: PCT/US2016/047630
§ 371 (c)(1),
(2) Date: Feb. 19, 2018

(87) PCT Pub. No.: WO2017/031359
PCT Pub. Date: Feb. 23, 2017

(65) Prior Publication Data
US 2018/0245332 A1     Aug. 30, 2018

Related U.S. Application Data

(60) Provisional application No. 62/206,348, filed on Aug. 18, 2015, provisional application No. 62/268,563, (Continued)

(51) Int. Cl.
*E04B 1/62* (2006.01)
*B32B 27/06* (2006.01)
(Continued)

(52) U.S. Cl.
CPC ............ *E04B 1/625* (2013.01); *B32B 3/26* (2013.01); *B32B 3/266* (2013.01); *B32B 5/022* (2013.01);
(Continued)

(58) Field of Classification Search
CPC ........... E04B 1/625; E04B 1/665; B32B 5/32; B32B 27/12; B32B 27/08; B32B 7/12;
(Continued)

(56) References Cited

U.S. PATENT DOCUMENTS

RE24,906 E    12/1960   Ulrich
3,039,893 A    6/1962   Banigan, Jr.
(Continued)

FOREIGN PATENT DOCUMENTS

CN        1869375        11/2006
CN       201047117        4/2008
(Continued)

OTHER PUBLICATIONS

Mukhopadhyay, "A Review on Designing the Waterproof Breathable Fabrics Part I: Fundamental Principles and Designing Aspects of Breathable Fabrics", 2008, Journal of Industrial Textiles, vol. 37, No. 3, pp. 225-262.
(Continued)

*Primary Examiner* — Brian Handville
(74) *Attorney, Agent, or Firm* — Kathleen B. Gross

(57) ABSTRACT

There is provided an article that includes a polymeric layer disposed on and covering a first major surface of an porous layer, an adhesive layer disposed on a second major surface of the elastic layer opposite the polymeric layer; and a liner disposed on a major surface of the polymeric layer opposite the first major surface of the elastic layer. The polymeric layer and the porous layer together form an air and water barrier that is water vapor permeable. The liner is water
(Continued)

vapor impermeable. In a preferred embodiment the polymeric layer comprises a polyoxyalkylene polymer having at least one end group derived from an alkoxy silane. A method of applying the article to a surface of a building component is also provided.

20 Claims, 3 Drawing Sheets

Related U.S. Application Data filed on Dec. 17, 2015, provisional application No. 62/376,202, filed on Aug. 17, 2016.

(51) Int. Cl.

| | | |
|---|---|---|
| *B32B 5/02* | (2006.01) | |
| *B32B 3/26* | (2006.01) | |
| *B32B 5/18* | (2006.01) | |
| *B32B 7/12* | (2006.01) | |
| *B32B 5/26* | (2006.01) | |
| *C09J 7/29* | (2018.01) | |
| *B32B 5/24* | (2006.01) | |
| *B32B 7/06* | (2019.01) | |
| *B32B 27/08* | (2006.01) | |
| *B32B 27/12* | (2006.01) | |
| *C09J 7/21* | (2018.01) | |
| *C09J 7/26* | (2018.01) | |
| *B32B 5/32* | (2006.01) | |
| *E04B 1/66* | (2006.01) | |

(52) U.S. Cl.
CPC .............. *B32B 5/024* (2013.01); *B32B 5/026* (2013.01); *B32B 5/18* (2013.01); *B32B 5/245* (2013.01); *B32B 5/26* (2013.01); *B32B 5/32* (2013.01); *B32B 7/06* (2013.01); *B32B 7/12* (2013.01); *B32B 27/065* (2013.01); *B32B 27/08* (2013.01); *B32B 27/12* (2013.01); *C09J 7/21* (2018.01); *C09J 7/26* (2018.01); *C09J 7/29* (2018.01); *E04B 1/665* (2013.01); *B32B 2255/26* (2013.01); *B32B 2305/026* (2013.01); *B32B 2307/51* (2013.01); *B32B 2307/724* (2013.01); *B32B 2307/7242* (2013.01); *B32B 2307/7244* (2013.01); *B32B 2307/7246* (2013.01); *B32B 2307/7265* (2013.01); *B32B 2307/748* (2013.01); *B32B 2405/00* (2013.01); *B32B 2419/00* (2013.01); *C09J 2301/18* (2020.08); *C09J 2400/243* (2013.01); *C09J 2400/263* (2013.01); *C09J 2433/00* (2013.01); *C09J 2471/005* (2013.01); *C09J 2471/006* (2013.01)

(58) Field of Classification Search
CPC .............. B32B 7/06; B32B 7/02; B32B 5/245; B32B 5/18; B32B 5/026; B32B 5/024; B32B 5/022; B32B 3/266; B32B 3/26; B32B 5/26; B32B 27/065; B32B 2307/7246; B32B 2255/26; B32B 2305/026; B32B 2307/7244; B32B 2307/51; B32B 2405/00; B32B 2307/748; B32B 2307/724; B32B 2419/00; B32B 2307/7265; B32B 2307/7242; C09J 7/26; C09J 7/21; C09J 7/29; C09J 2471/005; C09J 2400/263; C09J 2400/243; C09J 2433/00; C09J 2471/006; C09J 2201/20
See application file for complete search history.

(56) References Cited

U.S. PATENT DOCUMENTS

| | | |
|---|---|---|
| 3,169,899 A | 2/1965 | Steuber |
| 3,426,754 A | 2/1969 | Bierenbaum |
| 3,532,589 A | 10/1970 | David |
| 3,592,795 A | 7/1971 | Ashby |
| 3,627,722 A | 12/1971 | Seiter |
| 3,632,557 A | 1/1972 | Brode |
| 3,711,445 A | 1/1973 | Chu |
| 3,831,342 A | 8/1974 | Rejsa |
| 3,900,102 A | 8/1975 | Hurst |
| 3,937,640 A | 2/1976 | Tajima |
| 4,067,844 A | 1/1978 | Barron |
| 4,153,594 A | 5/1979 | Wilson, Jr. |
| 4,201,808 A | 5/1980 | Cully |
| 4,329,384 A | 5/1982 | Vesley |
| 4,330,590 A | 5/1982 | Vesley |
| 4,345,053 A | 8/1982 | Rizk |
| 4,366,307 A | 12/1982 | Singh |
| 4,374,237 A | 2/1983 | Berger |
| 4,379,201 A | 5/1983 | Heilmann |
| 4,543,403 A | 9/1985 | Isayama |
| 4,593,068 A | 6/1986 | Hirose |
| 4,618,653 A | 10/1986 | Kawakubo |
| 4,618,656 A | 10/1986 | Kawakubo |
| 4,645,816 A | 2/1987 | Pohl |
| 4,654,417 A | 3/1987 | Inoue |
| 4,687,818 A | 8/1987 | Kawakubo |
| 4,737,559 A | 4/1988 | Kellen |
| 4,751,122 A | 6/1988 | May |
| 4,774,356 A | 9/1988 | Inoue |
| 4,900,772 A | 2/1990 | Imanaka |
| 4,904,732 A | 2/1990 | Iwahara |
| 4,904,745 A | 2/1990 | Inoue |
| 4,923,650 A | 5/1990 | Antoon |
| 4,960,844 A | 10/1990 | Singh |
| 4,984,584 A | 1/1991 | Hansen |
| 5,068,304 A * | 11/1991 | Higuchi .................. C08G 18/10 528/25 |
| 5,073,611 A | 12/1991 | Rehmer |
| 5,120,594 A | 6/1992 | Mrozinski |
| 5,223,583 A | 6/1993 | Higuchi |
| 5,316,848 A | 5/1994 | Bartlett |
| 5,317,035 A | 5/1994 | Jacoby |
| 5,348,791 A | 9/1994 | Thompson |
| 5,364,955 A | 11/1994 | Zwiener |
| 5,374,477 A | 12/1994 | Lawless |
| 5,593,771 A | 1/1997 | Lawless |
| 5,756,751 A | 5/1998 | Schmalstieg |
| 5,811,566 A | 9/1998 | Watabe |
| 5,882,573 A | 3/1999 | Kwok |
| 5,895,301 A | 4/1999 | Porter |
| 5,972,147 A | 10/1999 | Janis |
| 5,986,014 A | 11/1999 | Kusakabe |
| 5,990,257 A | 11/1999 | Johnston |
| 6,001,946 A | 12/1999 | Waldman |
| 6,046,270 A | 4/2000 | Roesler |
| 6,176,961 B1 | 1/2001 | Mossbeck et al. |
| 6,197,912 B1 | 3/2001 | Huang |
| 6,235,365 B1 | 5/2001 | Schaughency |
| 6,361,634 B1 | 3/2002 | White |
| 6,495,229 B1 | 12/2002 | Carte |
| 6,534,129 B1 | 3/2003 | Miller et al. |
| 6,602,809 B1 | 8/2003 | Cabrey |
| 6,645,887 B2 | 11/2003 | Kocinec et al. |
| 6,706,225 B2 | 3/2004 | Cabrey |
| 6,901,712 B2 | 6/2005 | Lionel |
| 6,904,649 B2 | 6/2005 | VanBenschoten |
| 7,060,750 B2 | 6/2006 | Jansen |
| 7,094,859 B2 | 8/2006 | Schindler |
| 7,153,923 B2 | 12/2006 | Schindler |
| 7,351,296 B2 | 4/2008 | Waggoner |
| 7,682,675 B2 | 3/2010 | Boge |
| 7,718,250 B2 | 5/2010 | Sieber |
| 7,829,488 B2 | 11/2010 | Bennett |
| 7,833,916 B2 | 11/2010 | Leeser |
| 7,846,504 B2 | 12/2010 | Maier |

(56) References Cited

U.S. PATENT DOCUMENTS

| | | |
|---|---|---|
| 7,867,591 B2 | 1/2011 | Sieber |
| 8,001,736 B2 | 8/2011 | Goldberg |
| 8,061,098 B2 | 11/2011 | Whelan |
| 8,215,083 B2 | 7/2012 | Toas |
| 8,277,915 B2 | 10/2012 | Couturier |
| 8,334,227 B2 | 12/2012 | Tee |
| 8,399,088 B2 | 3/2013 | Deng |
| 8,535,786 B2 | 9/2013 | Schroer |
| 8,551,594 B2 | 10/2013 | Deiss |
| 8,609,213 B2 | 12/2013 | Wiercinski et al. |
| 8,613,181 B2 | 12/2013 | Jay |
| 8,883,284 B2 | 11/2014 | Todt |
| 8,893,440 B2 | 11/2014 | Wetmore |
| 8,931,228 B2 | 1/2015 | Wiercinski et al. |
| 8,931,229 B2 | 1/2015 | Wiercinski et al. |
| 8,986,786 B2 | 3/2015 | Maier |
| 9,192,960 B2 | 11/2015 | Tanley |
| 9,238,203 B2 | 1/2016 | Scheibner |
| 9,266,144 B2 | 2/2016 | Maier |
| 9,394,464 B2 | 7/2016 | Wiercinski et al. |
| 9,476,196 B2 | 10/2016 | Wiercinski et al. |
| 9,731,314 B2 | 8/2017 | Maier |
| 2002/0108564 A1 | 8/2002 | Gruenewald |
| 2003/0017292 A1 | 1/2003 | Sieber |
| 2003/0051807 A1 | 3/2003 | Yamaguchi |
| 2003/0056722 A1 | 3/2003 | Kitano et al. |
| 2003/0070391 A1 | 4/2003 | Tachauer |
| 2003/0165651 A1 | 9/2003 | Sieber |
| 2003/0180468 A1 | 9/2003 | Cray |
| 2004/0081794 A1 | 4/2004 | Titone |
| 2004/0137185 A1 | 7/2004 | Sieber |
| 2004/0137813 A1 | 7/2004 | Faucher |
| 2004/0180195 A1* | 9/2004 | Macuga .............. B32B 7/12 428/343 |
| 2005/0028938 A1 | 2/2005 | Hill |
| 2005/0058798 A1 | 3/2005 | Sieber |
| 2005/0069698 A1* | 3/2005 | Eubanks .............. B44C 1/10 428/354 |
| 2005/0137549 A1 | 6/2005 | Lindsay et al. |
| 2006/0040091 A1 | 2/2006 | Bletsos |
| 2006/0051558 A1 | 3/2006 | Sieber |
| 2007/0042196 A1 | 2/2007 | Smith |
| 2007/0060732 A1 | 3/2007 | Yang |
| 2007/0110943 A1 | 5/2007 | Sieber |
| 2007/0281562 A1 | 12/2007 | Kohlman |
| 2007/0282080 A1 | 12/2007 | Kawakami |
| 2008/0022620 A1 | 1/2008 | Crowley |
| 2008/0058492 A1 | 3/2008 | Griswold |
| 2008/0114098 A1 | 5/2008 | Griswold |
| 2008/0135159 A1 | 6/2008 | Bries |
| 2008/0153924 A1 | 6/2008 | Caron |
| 2008/0258341 A1 | 10/2008 | Parkes |
| 2008/0289279 A1 | 11/2008 | Hannan |
| 2009/0317583 A1 | 12/2009 | Naumann |
| 2010/0012882 A1 | 1/2010 | Sherman |
| 2010/0154338 A1 | 6/2010 | Riccelli |
| 2010/0307658 A1 | 12/2010 | Galush et al. |
| 2011/0151169 A1 | 6/2011 | Maier |
| 2011/0185666 A1 | 8/2011 | Russell |
| 2011/0244742 A1 | 10/2011 | Huang |
| 2012/0088052 A1 | 4/2012 | Cantu |
| 2012/0159880 A1* | 6/2012 | Veilleux .............. C03C 27/048 52/204.62 |
| 2012/0174508 A1 | 7/2012 | Brooks |
| 2012/0207998 A1 | 8/2012 | Ando |
| 2013/0004749 A1 | 1/2013 | Hao |
| 2013/0059105 A1 | 3/2013 | Wright |
| 2013/0084419 A1 | 4/2013 | Taylor |
| 2013/0196163 A1 | 8/2013 | Swanson |
| 2013/0274700 A1 | 10/2013 | Harris |
| 2014/0037882 A1 | 2/2014 | Georgeau |
| 2014/0093679 A1 | 4/2014 | Okamoto |
| 2014/0186566 A1 | 7/2014 | Wood |
| 2015/0225614 A1 | 8/2015 | Kim |
| 2015/0267076 A1 | 9/2015 | Bodkhe |
| 2015/0298427 A1 | 10/2015 | Kronenberg |
| 2015/0368508 A1 | 12/2015 | Bodkhe |
| 2017/0072430 A1 | 3/2017 | Maier |
| 2017/0218223 A1 | 8/2017 | Bodkhe |
| 2018/0237662 A1 | 8/2018 | Widenbrant |

FOREIGN PATENT DOCUMENTS

| | | | |
|---|---|---|---|
| CN | 202866172 | 4/2013 | |
| CN | 105331298 | 2/2016 | |
| DE | 19817829 | 1/1999 | |
| DE | 10031213 | 1/2002 | |
| DE | 10255600 | 6/2004 | |
| EP | 0372561 | 6/1990 | |
| EP | 0676403 | 10/1995 | |
| EP | 1289754 | 11/2003 | |
| EP | 1459884 | 11/2006 | |
| EP | 2101027 | 12/2014 | |
| EP | 2868468 | 5/2015 | |
| FR | 2917758 | 12/2008 | |
| GB | 2473618 | 3/2011 | |
| JP | S50156599 | 12/1975 | |
| JP | S546096 | 1/1979 | |
| JP | S55-13767 | 1/1980 | |
| JP | S55-13768 | 1/1980 | |
| JP | S57164123 | 10/1982 | |
| JP | S6422904 | 1/1989 | |
| JP | H04-055444 | 9/1992 | |
| JP | H06172631 | 6/1994 | |
| JP | H06211922 | 8/1994 | |
| JP | 11071823 | 3/1999 | |
| JP | H1160724 | 3/1999 | |
| JP | H11100427 | 4/1999 | |
| JP | H11116763 | 4/1999 | |
| JP | 2000-169544 | 6/2000 | |
| JP | 2000-169545 | 6/2000 | |
| JP | 2001-072854 | 3/2001 | |
| JP | 2001-294830 | 10/2001 | |
| JP | 2001-323040 | 11/2001 | |
| JP | 2002-155145 | 5/2002 | |
| JP | 2002-212415 | 7/2002 | |
| JP | 3313360 | 8/2002 | |
| JP | 2002-249538 | 9/2002 | |
| JP | 2004-137861 | 5/2004 | |
| JP | 2008-303650 | 12/2008 | |
| WO | WO 95/33007 | 12/1995 | |
| WO | WO 1998-056866 | 12/1998 | |
| WO | WO 2002-01013 | 1/2002 | |
| WO | WO 2008-085394 | 7/2008 | |
| WO | WO-2012088538 A2 * | 6/2012 | ........... C03C 27/048 |
| WO | WO 2012-092019 | 7/2012 | |
| WO | WO 2013-136108 | 9/2013 | |
| WO | WO 2014-121007 | 8/2014 | |
| WO | WO 2015-010208 | 1/2015 | |
| WO | WO 2015-126931 | 8/2015 | |
| WO | WO 2015-183354 | 12/2015 | |
| WO | WO 2016-106273 | 6/2016 | |

OTHER PUBLICATIONS

Pocius, "Adhesion and Adhesives Technology", Hanser/Gardner Publications.,1997 Cincinnati, Ohio, pp. 216-223.

Premium Self-adhering Water Resistive and Air Barrier, Delta Cosella Dorken, Spycor Building Products < https://www.spycorbuilding.com/Cosella-Dorken-DELTA-VENT-SA-p/dlvt-sa.htm > , pp. 1-3.

Satas, "Handbook of Pressure Sensitive Adhesive Technology", New York, Chapter 15, 1989, pp. 396-456.

Wang, "Controlled/"living" radical polymerization. Atom transfer radical polymerization in the presence of transition-metal complexes", 1995., Journal of the American Chemical Society, vol. 117, No. 20, pp. 5614-5615.

International Search Report for PCT International Application No. PCT/US2016/047630, dated Nov. 21, 2016, 6 pages.

(56) References Cited

OTHER PUBLICATIONS

Matweb.com, Tensile Property Testing of Plastics, Nov. 28, 2007, obtained from https://web.archive.org/web/20071128152248/http://www.matweb.com/reference/tensilestrength.aspx (Year: 2007), 2 pages.

* cited by examiner

AIR AND WATER BARRIER ARTICLE WITH POROUS LAYER AND LINER

CROSS-REFERENCE TO RELATED APPLICATIONS

This application is a national stage filing under 35 U.S.C. 371 of PCT/US2016/047630, filed Aug. 18, 2016, which claims priority to U.S. Provisional Application Nos. 62/206,348, filed Aug. 18, 2015; 62/268,563, filed Dec. 17, 2015; and 62/376,202, filed Aug. 17, 2016, the disclosures of which are incorporated by reference in their entirety herein.

FIELD

The present disclosure also relates to articles that are water vapor permeable and air and water barriers.

BACKGROUND

Air barrier systems control movement of air, and specifically water vapor, across a surface of a structure, such as a building enclosure. In exterior walls, uncontrolled air flow is the greatest source of moisture and condensation damage. Indoor comfort is affected by air temperature, relative humidity, direction of airflow and surrounding surface temperatures. Indoor air quality is enhanced by air barrier systems by efficiently keeping pollutants out of building interiors. Pollutants include water vapor, suspended particulates, dust, insects, and smells, for example. Air barrier systems have significant impact on electricity consumption and gas bills. Air barrier systems in nonresidential buildings are estimated to reduce air leakage by up to 83 percent, reduce heating bills more than 40% and reduce electricity consumption more than 25% according to simulations by the National Institute of Standards and Technology (NIST) compared to typical buildings without air barriers. Water vapor is a key ingredient in corrosion and mold growth. Air barrier systems help prevent water vapor from being transported by air movement between exteriors and interiors of structures, such as buildings.

The use of air barrier systems has been a requirement in Canada for almost 25 years and is becoming important in North America due to net zero energy requirements by 2030, required by the US Army Corp of Engineering, ASHRAE 90.1, and International Energy Conservation Code—2009. On Dec. 16, 2011, the DC Construction Codes Coordinating Board (CCCB) adopted the 2012 International Energy Conservation Code (IECC).

Some membrane sheets having both waterproofing properties and moisture permeability are known. One typical example of such moisture-permeable waterproofing sheets is flash-spun nonwoven fabrics. U.S. Pat. No. 3,169,899 (Steuber), for example, discloses a flash-spun nonwoven fabric. U.S. Pat. No. 3,532,589 (David) discloses a method for producing a flash-spun nonwoven fabric. The nonwoven fabric thus obtained has an appropriate pore size to block liquid water but allow water vapor to pass through. A known example of the nonwoven fabric is commercially available under the trade designation "Tyvek" from E. I. Du Pont de Nemours and Company, Wilmington, Del. USA, which is obtained by thermo-compressing a three-dimensionally-meshed fiber of high-density polyethylene. Such a moisture-permeable waterproofing sheet can prevent external liquid water from infiltrating through the sheet, but can vent water in vapor form.

SUMMARY

However, openings such as windows or doors are not flat. It is difficult to form a waterproofing layer only with a waterproofing sheet, and therefore the opening is often finished with a waterproofing tape with a pressure sensitive adhesive layer provided thereon. In this case, since the most commonly used pressure sensitive adhesives often are made of rubber or asphalt materials, the moisture permeability of the entire tape decreases, and the same moisture retention problem as that of a common waterproofing sheet can occur.

Mechanical fasteners, can be used to affix the moisture-vapor permeable waterproofing sheet on substrates of exterior walls. As a result, moisture may permeate from gaps of such fasteners, such as nail holes, over a long period of time. It is beneficial for such moisture-vapor permeable waterproofing sheets to pass ASTM D-1970/D-1970M-13 or similar modified tests such as Modified Test 1 of ASTM D-1970/D-1970M-13, Modified Test 2 of ASTM D-1970/D-1970M-13, Modified Test 3 of ASTM D-1970/D-1970M-13, or combinations thereof for nail sealability.

It is also beneficial for adhesives provided on these air and water barrier articles to provide robust adhesion in a variety of conditions. For example, it is beneficial for such an adhesive to adhere to wet substrates, which are common conditions on surfaces of building components at a construction site. There exists a need for an air and water barrier article that, when wound in a roll with a release liner, provides appropriate release from the article and an adhesive used to coat at least a portion of the article to provide easy application of the air and water barrier article to substrates, such as building components. There is also a need for these air and water barrier articles to provide acceptable permeability performance with respect to water vapor according to ASTM E96/E96M-13.

In one aspect, the present disclosure provides an article that includes a polymeric layer disposed on and covering a first major surface of an elastic porous layer, an adhesive layer disposed on a second major surface of the elastic porous layer opposite the polymeric layer, and a liner disposed on a major surface of the polymeric layer opposite the first major surface of the elastic porous layer. The polymeric layer and the elastic porous layer together form an air and water barrier that is water vapor permeable. The liner is water vapor impermeable. At least a portion of the article covered with the liner is vapor impermeable and an air and water barrier.

In another aspect, the present disclosure provide an article that includes a polymeric layer disposed on and covering a first major surface of an elastic porous layer, an adhesive layer disposed on a second major surface of the elastic porous layer opposite the polymeric layer, and a liner disposed on a major surface of the polymeric layer opposite the first major surface of the elastic porous layer. The polymeric layer and the elastic porous layer together form an air and water barrier that is water vapor permeable. The liner is water vapor impermeable covers only a portion of the major surface of the polymeric layer. At least a portion of the article covered with the liner is vapor impermeable and an air and water barrier.

In another aspect, the present disclosure provides a method of applying an air and water barrier article. The method includes adhering at least a portion of the adhesive layer on a roll of the article described above to a surface of a building component, so that the air and water barrier article is affixed to the surface of the building component. The method includes unwinding at least a portion of the roll.

During the unwinding, the liner remains disposed on the major surface of the polymeric layer opposite the first major surface of the elastic porous layer. The method also includes peeling at least a portion of the liner away from a portion of the self-sealing article. In some embodiments, the method includes leaving a portion of the liner disposed on the major surface of the polymer layer.

Various aspects and advantages of exemplary embodiments of the present disclosure have been summarized. The above Summary is not intended to describe each illustrated embodiment or every implementation of the present disclosure. Further features and advantages are disclosed in the embodiments that follow. The Drawings and the Detailed Description that follow more particularly exemplify certain preferred embodiments using the principles disclosed herein.

BRIEF DESCRIPTION OF THE DRAWINGS

The disclosure may be more completely understood in consideration of the following detailed description of various embodiments of the disclosure in connection with the accompanying figures, in which.

Figure 1:
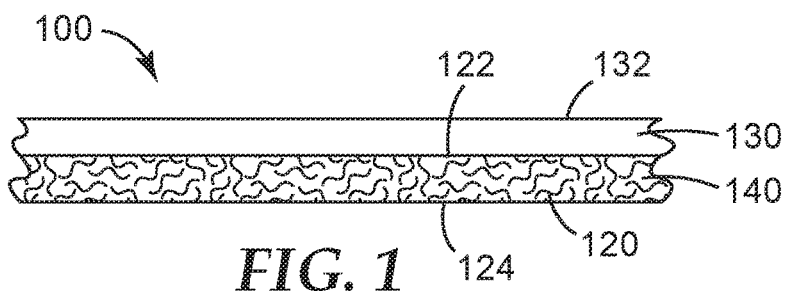
FIG. 1 is a side cross section view of an embodiment of an air and water barrier article according to the present disclosure.

While the above-identified drawing, which may not be drawn to scale, sets forth various embodiments of the present disclosure, other embodiments are also contemplated, as noted in the Detailed Description. In all cases, this disclosure describes the presently disclosure by way of representation of exemplary embodiments and not by express limitations. It should be understood that numerous other modifications and embodiments can be devised by those skilled in the art, which fall within the scope and spirit of this disclosure.

DETAILED DESCRIPTION

As used in this specification, the recitation of numerical ranges by endpoints includes all numbers subsumed within that range (e.g. 1 to 5 includes 1, 1.5, 2, 2.75, 3, 3.8, 4, and 5, and the like).

Unless otherwise indicated, all numbers expressing quantities or ingredients, measurement of properties and so forth used in the Specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

For the following defined terms, these definitions shall be applied for the entire Specification, including the claims, unless a different definition is provided in the claims or elsewhere in the Specification based upon a specific reference to a modification of a term used in the following Glossary:

Glossary

The words "a", "an", and "the" are used interchangeably with "at least one" to mean one or more of the elements being described.

The term "layer" refers to any material or combination of materials on or overlaying a substrate.

Words of orientation such as "atop, "on," "covering," "uppermost," "overlaying," "underlying" and the like for describing the location of various layers, refer to the relative position of a layer with respect to a horizontally-disposed, upwardly-facing substrate. It is not intended that the substrate, layers or articles encompassing the substrate and layers, should have any particular orientation in space during or after manufacture.

The terms "about" or "approximately" with reference to a numerical value or a shape means+/−five percent of the numerical value or property or characteristic, but expressly includes the exact numerical value. For example, a viscosity of "about" 1 Pa-sec refers to a viscosity from 0.95 to 1.05 Pa-sec, but also expressly includes a viscosity of exactly 1 Pa-sec. Similarly, a perimeter that is "substantially square" is intended to describe a geometric shape having four lateral edges in which each lateral edge has a length which is from 95% to 105% of the length of any other lateral edge, but which also includes a geometric shape in which each lateral edge has exactly the same length.

The term "elastic" as used herein mean materials having an elongation of greater than or equal to 90% in either the cross direction or the machine direction. The elastic porous layer disclosed herein need not demonstrate recovery properties. Accordingly, the term elastic as used herein is interchangeable with the word extensible.

The term "substantially" with reference to a property or characteristic means that the property or characteristic is exhibited to a greater extent than the opposite of that property or characteristic is exhibited. For example, a substrate that is "substantially" transparent refers to a substrate that transmits more radiation (e.g. visible light) than it fails to transmit (e.g. absorbs and reflects). Thus, a substrate that transmits more than 50% of the visible light incident upon its surface is substantially transparent, but a substrate that transmits 50% or less of the visible light incident upon its surface is not substantially transparent.

By using the term "overcoated" to describe the position of a layer with respect to a substrate or other element of an article of the present disclosure, we refer to the layer as being atop the substrate or other element, but not necessarily contiguous to either the substrate or the other element.

The term "homogeneous" means exhibiting only a single phase of matter when observed at a macroscopic scale.

The term "(meth)acrylate" with respect to a monomer, oligomer or means a vinyl-functional alkyl ester formed as the reaction product of an alcohol with an acrylic or a methacrylic acid.

The term "adjoining" with reference to a particular layer means joined with or attached to another layer, in a position wherein the two layers are either next to (i.e., adjacent to) and directly contacting each other, or contiguous with each other but not in direct contact (i.e., there are one or more additional layers intervening between the layers).

The term "separated by" to describe the position of a layer with respect to another layer and the substrate, or two other layers, means that the described layer is between, but not necessarily contiguous with, the other layer(s) and/or substrate.

The term "(co)polymer" or "(co)polymeric" includes homopolymers and copolymers, as well as homopolymers or copolymers that may be formed in a miscible blend, e.g., by coextrusion or by reaction, including, e.g., transesterification. The term "copolymer" includes random, block, graft, and star copolymers.

The term "water vapor permeable" as used herein means an article having a permeance of more than 1 perm (inch-pounds units) according to ASTM E 96 Procedure A (Desiccant Method). Likewise, water vapor impermeable refers to articles having a permeance of less than 1 perm.

The term "discontinuous" as used herein means a coating having an interrupted extension along a two dimensional surface. For example, in some embodiments, an air and water barrier article having a discontinuous coating of pressure sensitive adhesive does not cover a major surface of a polymeric layer or a major surface of a porous layer.

The term "perforated" as used herein means materials allowing passage of liquids at ambient conditions.

The term "microporous" as used herein means a material that is permeable to moisture vapor, but impermeable to liquid water at 55 cm of water pressure.

The term "air and water barrier" as used herein means material that is designed and constructed to provide the principal plane of air tightness through an environmental separator and that has an air permeance rate no greater than 0.02 L per square meter per second at a pressure difference of 75 Pa when tested in accordance with ASTM E 2178-13 and provides acceptable barrier performance with respect to water according to AATCC 127-2013. In some embodiments, the air and water barrier is impermeable to liquid water at 55 cm of water pressure.

The phrase "comprises at least one of" followed by a list refers to comprising any one of the items in the list and any combination of two or more items in the list. The phrase "at least one of" followed by a list refers to any one of the items in the list or any combination of two or more items in the list.

Air and Water Barrier Article

Referring now to FIG. 1, in some embodiments, presently disclosed air and water barrier articles 100 include a polymeric layer 130 that is disposed on and covers a first major surface 122 of an elastic porous layer 120.

Figure 2:
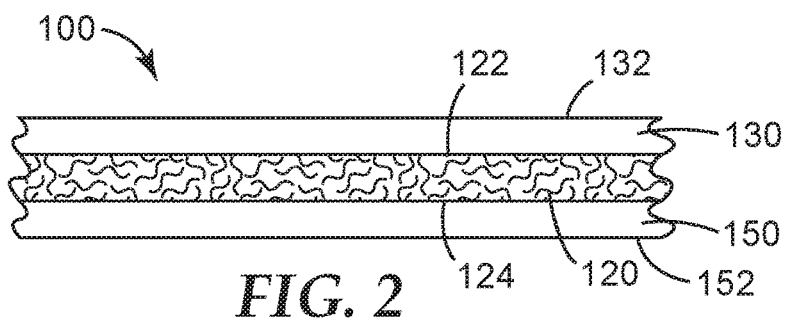
FIG. 2 is a side cross section view of another embodiment of an air and water barrier article according to the present disclosure.
Figure 3:
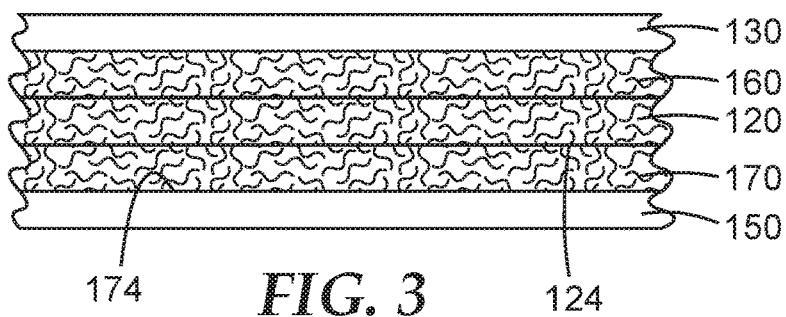
FIG. 3 is a side cross section view of still another embodiment of an air and water barrier article according to the present disclosure.

In some embodiments, the presently disclosed air and water barrier articles 100 include a layer of pressure sensitive adhesive useful for adhering the air and water barrier 100 articles to various surfaces. Referring now to FIG. 2, in some embodiments, the presently disclosed air and water barrier articles 100 include an adhesive layer 150 disposed on a major surface 124 of the elastic porous layer 120 opposite the polymeric layer 130. Referring to FIG. 3, in some embodiments, the presently disclosed air and water barrier articles 100 include a first porous layer 160 disposed between the polymeric layer 130 and the elastic porous layer 120. In some embodiments, a second porous layer 170 disposed on a major surface of the elastic porous layer 124 opposite the polymeric layer 130, and an adhesive layer 150 disposed on a major surface 174 of the second porous layer 170 opposite the elastic porous layer 120. In some embodiments, the pressure sensitive adhesive is discontinuously disposed on at least one of the aforementioned surfaces 124, 132, 174 in a random manner. In some embodiments, the pressure sensitive adhesive is discontinuously disposed on at least one of the aforementioned surfaces 124, 132, 174 in a patterned manner. In some embodiments, the pressure sensitive adhesive covers between 10% and 90% of the second major surface 124 of the elastic porous layer 120, between 10% and 90% of the major surface 132 of the polymeric layer 130, between 10% and 90% of the second major surface 174 of the second porous layer 170, or between 10% and 90% of both the second major surface 124 of the elastic porous layer 120 or the second major surface 174 of the second porous layer 170 and the major surface 132 of the polymeric layer 130. In some embodiments, the pressure sensitive adhesive is a permeable pressure sensitive adhesive that is continuously disposed on at least one of a second major surface 124 of the elastic porous layer 120, a second major surface 174 of the second porous layer 170, a major surface 132 of the polymeric layer 130, or combinations thereof. In some embodiments, the pressure sensitive adhesive is disposed only on one surface of the air and water barrier article.

In some embodiments, the pressure sensitive adhesive layer 150 is discontinuously disposed on at least one of the outer the first major surface 124 of the elastic porous layer 120 or the first major surface 174 of the second porous layer 170. In some embodiments, the pressure sensitive adhesive layer 150 is discontinuously disposed on the first major surface 124 of the elastic porous layer 120 or the first major surface 174 of the second porous layer 170 in a random manner. In some embodiments, the pressure sensitive adhesive is discontinuously disposed on the first major surface 124 of the elastic porous layer 120 or the first major surface 174 of the second porous layer 170 in a patterned manner. In some embodiments, the pressure sensitive adhesive covers 10% to 90% of the surface area of on the first major surface 124 of the elastic porous layer 120 or the first major surface 174 of the second porous layer 170. In some embodiments, the pressure sensitive adhesive is a permeable pressure sensitive adhesive that is continuously disposed on the first major surface 124 of the elastic porous layer 120 or the first major surface 174 of the second porous layer 170.

Figure 4A:
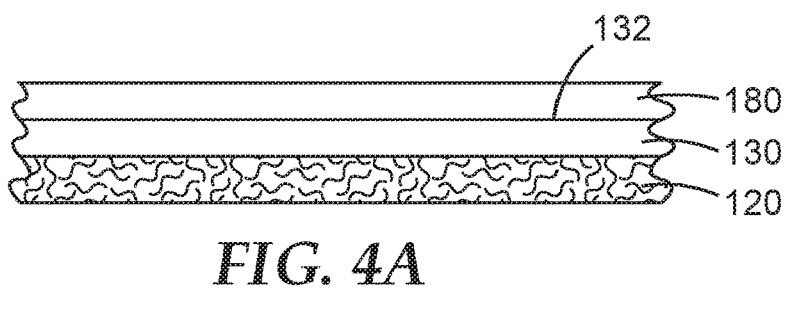
FIG. 4A is a side cross section view of an embodiment of an air and water barrier article having a microporous membrane according to the present disclosure.
Figure 4B:
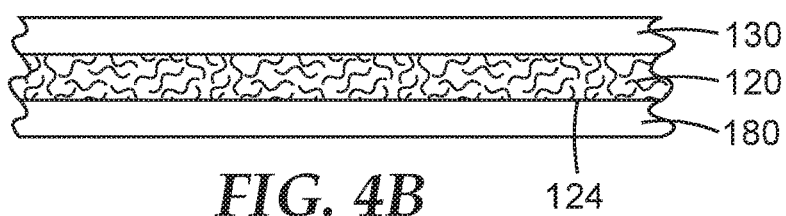
FIG. 4B is a side cross section view of another embodiment of an air and water barrier article having a microporous membrane according to the present disclosure.

Referring now to FIG. 4A, any of the previously disclosed embodiments of the presently disclosed air and water barrier article can also include a microporous membrane 180 disposed on a major surface 132 of the polymeric layer 130 opposite the elastic porous layer 120. Referring now to FIG. 4B, any of the previously disclosed embodiments of the sealing article can also include a microporous membrane 180 disposed on a major surface 124 of the elastic porous layer 120 opposite the polymeric layer 130. The presently disclosed microporous membrane can comprise at least one of stretched calcium carbonate filled polyolefin materials, immiscible polymer materials having an extractable component, or polyolefins.

In some embodiments, the presently disclosed air and water barrier articles have an elongation of greater than or equal to 90% in the cross direction, in some embodiments, greater than or equal to 92% in the cross direction. In some embodiments, the air and water barrier articles have an elongation of greater than or equal to 90% in the machine direction, in some embodiments, greater than or equal to 105% in the machine direction or greater than or equal to 109% in the machine direction.

In some embodiments, air and water barrier articles according to the present disclosure meet the requirements of Modified Test 1 of ASTM D-1970/D-1970M-13, Modified Test 2 of ASTM D-1970/D-1970M-13, Modified Test 3 of ASTM D-1970/D-1970M-13, or combinations thereof. Meeting the requirements of Modified Test 1 of ASTM D-1970/D-1970M-13, Modified Test 2 of ASTM D-1970/D-1970M-13, Modified Test 3 of ASTM D-1970/D-1970M-13, or combinations thereof can depend on a variety of factors. In general, polymeric layer comprising a polyoxyalkylene polymer having at least one end group derived from an alkoxy silane can cause the article to meet these requirements for nail sealability. The presence of trialkoxy silane groups in the polymer precursor and the presence of filler in the polymeric layer can also improve the nail sealability of the air and water barrier article. In some embodiments, self-sealing articles that meet the requirements of Modified Test 1 of ASTM D-1970/D-1970M-13, Modified Test 2 of ASTM D-1970/D-1970M-13, Modified Test 3 of ASTM D-1970/D-1970M-13 have a polymeric layer including at least 5, 10, 15, 20, or 25 weight percent filler, including any of the fillers described below. In some embodiments, self-sealing articles that meet the requirements of Modified Test 1 of ASTM D-1970/D-1970M-13, Modified Test 2 of ASTM D-1970/D-1970M-13, Modified Test 3 of ASTM D-1970/D-1970M-13 include a polymeric layer having crosslinks derived from a trialkoxy silane.

Elastic Porous Layer, First Porous Layer and Second Porous Layer

The elastic porous layer, first porous layer, and second porous layer may comprise a variety of suitable materials including woven webs, non-woven webs, textiles, perforated plastic films, and combinations thereof. The term "nonwoven" refers to a material having a structure of individual fibers or threads that are interlaid but not in an identifiable manner such as in a knitted fabric. Examples of non-woven webs include spunbond webs, spunlaced webs, airlaid webs, meltblown web, and bonded carded webs. In some embodiments, the substrate is a fibrous material (e.g., a woven, nonwoven, or knit material). Useful porous layers may be made of natural fibers (e.g., wood or cotton fibers), synthetic fibers (e.g., thermoplastic fibers), or a combination of natural and synthetic fibers. Examples of suitable materials for forming thermoplastic fibers include polyolefins (e.g., polyethylene, polypropylene, polybutylene, ethylene copolymers, propylene copolymers, butylene copolymers, and copolymers and blends of these polymers), polyesters, and polyamides. The fibers may also be multi-component fibers, for example, having a core of one thermoplastic material and a sheath of another thermoplastic material. In some embodiments, the substrate comprises multiple layers of nonwoven materials with, for example, at least one layer of a meltblown nonwoven and at least one layer of a spunbonded nonwoven, or any other suitable combination of nonwoven materials. For example, the elastic porous layer, first porous layer, or second porous layer may be a spunbond-meltblown-spunbond, spunbond-spunbond, or spunbond-spunbond-spunbond multilayer material.

In some embodiments, materials useful in the presently disclosed elastic porous layer, first porous layer, or second porous layer include perforated polymeric materials. In some embodiments, perforated polymeric material is selected from polyolefin, oriented polyolefin, polyester, oriented polyester, multilayer films and combinations thereof. Examples of suitable perforated materials, such as microperforated materials, are those disclosed in WO 2011/081894 (Scheibner et al.), which is herein incorporated by reference in its entirety. In some embodiments, the presently disclosed elastic porous layer, first porous layer, or second porous layer is a nonwoven comprising fibers selected from polyester, polylactic acid, polyolefin, polyamide, rayon, and combinations thereof.

In some embodiments, the elastic porous layer comprises at least one of a plurality of elastomeric strands, elastic net, elastic nonwoven material, elastic woven fabric, elastic knitted fabric, elastic foam, or an elastic microperforated film. Examples of useful materials for making any of these elastic materials include thermoplastic elastomers such as ABA block copolymers, polyurethane elastomers, polyolefin elastomers (e.g., metallocene polyolefin elastomers), polyamide elastomers, ethylene vinyl acetate elastomers, and polyester elastomers. An ABA block copolymer elastomer generally is one where the A blocks are polystyrenic, and the B blocks are conjugated dienes (e.g., lower alkylene dienes). The A block is generally formed predominantly of substituted (e.g, alkylated) or unsubstituted styrenic moieties (e.g., polystyrene, poly(alphamethylstyrene), or poly(t-butylstyrene)), having an average molecular weight from about 4,000 to 50,000 grams per mole. The B block(s) is generally formed predominantly of conjugated dienes (e.g., isoprene, 1,3-butadiene, or ethylene-butylene monomers), which may be substituted or unsubstituted, and has an average molecular weight from about 5,000 to 500,000 grams per mole. The A and B blocks may be configured, for example, in linear, radial, or star configurations. An ABA block copolymer may contain multiple A and/or B blocks, which blocks may be made from the same or different monomers. A typical block copolymer is a linear ABA block copolymer, where the A blocks may be the same or different, or a block copolymer having more than three blocks, predominantly terminating with A blocks. Multi-block copolymers may contain, for example, a certain proportion of AB diblock copolymer, which tends to form a more tacky elastomeric film segment. In some embodiments, the elastic porous layer useful for practicing the present disclosure is made from a variety of useful materials (e.g., polypropylene, polypropylene-polyethylene copolymers, and thermoplastic polyurethanes). In some embodiments, the elastic porous layer is made, for example, from multi-component (e.g., bi-component such as core-sheath) fibers.

Several materials useful for making the elastic porous layer are commercially available, for example, polyolefins from ExxonMobil, Houston, Tex., under the trade designation "VISTAMAXX" and thermoplastic polyurethane elastomers from Huntsman, The Woodlands, Tex., under the trade designation "IROGRAN". In some embodiments, the elastic porous layer comprises a marnix nonwoven. In some embodiments, the elastic porous layer comprises a spunbond nonwoven available from Idemitsu Kosan Co., Ltd., Tokyo, Japan, under the trade designation "STRAFLEX".

In some embodiments, the elastic porous layer, first porous layer, or second porous layer comprises blown microfibers. In some embodiments, the elastic porous layer, first porous layer, or second porous layer includes at least one extruded netting or scrims. In some embodiments, the elastic porous layer, first porous layer, or second porous layer is a woven material.

In some embodiments, the elastic porous layer, first porous layer, or second porous layer is microporous membrane. Suitable microporous membranes include a thermally induced phase separated porous membrane as described in U.S. Pat. No. 5,120,594 (Mrozinski). Such membranes are commercially available under the trade designation "PROPORE" from 3M, St. Paul, Minn. Another suitable microporous membranes is a stretched calcium carbonate filled polyolefin film as described in U.S. Pat. No. 4,923,650 (Antoon). Such membranes are commercially available under the trade designation "MICROPRO" from Clopay Plastics, Mason, Ohio. Suitable microporous membranes can further include spunbonded or fibrous bonded polyolefin as described in U.S. Pat. No. 3,532,589 (David) and U.S. Pat. No. 5,972,147 (Janis). In some instances, the polyolefins (e.g., polyethylene and polypropylene) are cast, annealed, and then stretched. One suitable microporous membrane is commercially available under the trade designation "TYVEK" from E.I. Du Pont deNemours Corp., Wilmington, Del. Other suitable microporous membranes include oriented polymeric films as described in U.S. Pat. No. 5,317,035 (Jacoby et al.), and which comprise ethylene-propylene block copolymers. Such membranes are commercially available under the trade designation "APTRA films" from BP-Amoco Corp., Atlanta, Ga. Suitable microporous membranes can be formed from immiscible polymer materials or polymer materials that have an extractable component, such as solvent. These materials are stretched after casting.

In some embodiments, the elastic porous layer has a moisture vapor transmission rate of at least 1 perm, at least 5 perms, or at least 10 perms.

In some embodiments, the elastic porous layer can dissipate water in the plane of the elastic porous layer. This is shown in Table 7, below. Such water dissipation can provide a mechanism for passing at least one of the nail sealability tests by removing the water from the nail sites. In some embodiments, the elastic porous layer has a water strike through time of up to 400, 300, or 250 seconds as measured according to the test method in the examples, below.

Polymeric Layer

A variety of polymeric materials are useful for covering and in some embodiments at least partially impregnating and/or encapsulating the porous layer described above in any of its embodiments to make the air and water barrier article according to the present disclosure. In some embodiments, the polymeric material is a polyoxyalkylene polymer having at least one end group derived from an alkoxy silane. The polyoxyalkylene polymer may be silyl terminated. In some embodiments, the polyoxyalkylene polymer further comprises at least one silyl modified branched group.

A production method of a polyoxyalkylene polymer having a reactive silicon group may include those proposed in Japanese Kokoku Publication S45-36319, Japanese Kokoku Publication S46-12154, Japanese Kokai Publication S50-156599, Japanese Kokai Publication S54-6096, Japanese Kokai Publication S55-13767, Japanese Kokai Publication S55-13468, Japanese Kokai Publication S57-164123, Japanese Kokoku Publication H3-2450, U.S. Pat. Nos. 3,632,557, 4,345,053, 4,366,307, and 4,960,844. Also, useful polymers for the air and water barrier articles according to the present disclosure include polyoxyalkylene polymers having a number average molecular weight of 6,000 or higher and a Mw/Mn ratio of 1.6 or lower and thus having high molecular weight and narrow molecular weight distribution as disclosed in Japanese Kokai Publication S61-197631, Japanese Kokai Publication S61-215622, Japanese Kokai Publication S61-215623, Japanese Kokai Publication S61-218632, Japanese Kokai Publication H3-72527, Japanese Kokai Publication H3-47825, and Japanese Kokai Publication H8-231707.

In some embodiments, the main chain of the polyoxyalkylene polymer may contain other functional groups such as a urethane bond. The aforementioned urethane bond component is not particularly limited and may include a segment (hereinafter, also referred to as an amido segment) produced by reaction of an isocyanato group and an active hydrogen group.

The amido segment can be represented by the following formula:

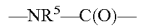

(wherein $R^5$ represents a hydrogen atom or a monovalent organic group, desirably a substituted or unsubstituted monovalent $C_{1-20}$ hydrocarbon group, and more desirably a substituted or unsubstituted monovalent $C_{1-8}$ hydrocarbon group).

The aforementioned amido segment may be part of a urethane group produced, for example, by reaction of an isocyanato group and a hydroxy group; a urea group produced by reaction of an isocyanato group and an amino group; and a thiourethane group produced by reaction of an isocyanato group and a mercapto group. Also, in the present disclosure, groups produced by reaction of an active hydrogen in the aforementioned urethane group, urea group, and thiourethane group with another isocyanato group also include a segment represented by the formula

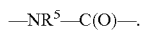

Examples of methods for industrially producing a polyoxyalkylene polymer having an amido segment and a reactive silicon group include those disclosed in Japanese Kokoku Publication S46-12154 (U.S. Pat. No. 3,632,557), Japanese Kokai Publications S58-109529 (U.S. Pat. No. 4,374,237), S62-13430 (U.S. Pat. No. 4,645,816), H8-53528 (EP 0676403), and H10-204144 (EP 0831108), Japanese Kohyo Publication 2003-508561 (U.S. Pat. No. 6,197,912), Japanese Kokai Publications H6-211879 (U.S. Pat. No. 5,364,955), H10-53637 (U.S. Pat. No. 5,756,751), H11-100427, 2000-169544, 2000-169545 and 2002-212415, Japanese Patent No. 3,313,360, U.S. Pat. Nos. 4,067,844 and 3,711,445, Japanese Kokai Publications 2001-323040, H11-279249 (U.S. Pat. No. 5,990,257), 2000-119365 (U.S. Pat. No. 6,046,270), S58-29818 (U.S. Pat. No. 4,345,053), H3-47825 (U.S. Pat. No. 5,068,304), H11-60724, 2002-155145, and 2002-249538, WO03/018658, WO03/059981, and Japanese Kokai Publication H6-211879 (U.S. Pat. No. 5,364,955), H10-53637 (U.S. Pat. No. 5,756,751), H10-204144 (EP0831108), 2000-169544, 2000-169545, and 2000-119365 (U.S. Pat. No. 6,046,270).

A (meth) acrylic ester polymer having a reactive silicon group may be added to the polyoxyalkylene polymer having a reactive silicon group, if desired. Various (meth) acrylic ester monomers may be useful for providing the main chain of the (meth) acrylic ester polymer. Examples of useful (meth) acrylic ester monomers include methyl (meth) acrylate, ethyl (meth) acrylate, n-propyl (meth) acrylate, isopropyl (meth) acrylate, n-butyl (meth) acrylate, isobutyl (meth) acrylate, t-butyl (meth) acrylate, n-pentyl (meth) acrylate, n-hexyl (meth) acrylate, cyclohexyl (meth) acrylate, n-heptyl (meth) acrylate, n-octyl (meth) acrylate, 2-ethylhexyl (meth) acrylate, nonyl (meth) acrylate, decyl (meth) acrylate, dodecyl (meth) acrylate, phenyl (meth) acrylate, tolyl (meth) acrylate, benzyl (meth) acrylate, 2-methoxyethyl (meth) acrylate, 3-methoxybutyl (meth) acrylate, 2-hydroxyethyl (meth) acrylate, hydroxypropyl (meth) acrylate, stearyl (meth) acrylate, glycidyl (meth) acrylate, 2-aminoethyl (meth) acrylate, gamma-(methacryloyloxypropyl) trimethoxysilane, gamma-(methacryloyloxypropyl) dimethoxymethylsilane, methacryloyloxymethyltrimethoxysilane, methacryloyloxymethyltriethoxysilane; methacryloyloxymethyldimethoxymethylsilane; methacryloyloxymethyldiethoxymethylsilane, ethylene oxide adduct of (meth) acrylic acid, trifluoromethylethyl (meth) acrylate, 2-trifluoromethylethyl (meth) acrylate, 2-perfluoroethylethyl (meth) acrylate, 2-perfluoroethyl-2-perfluorobutylethyl (meth) acrylate, perfluoroethyl (meth) acrylate, trifluoromethyl (meth) acrylate, bis (trifluoromethyl) methyl (meth) acrylate, 2-trifluoromethyl-2-perfluoroethylethyl (meth) acrylate, 2-perfluorohexylethyl (meth) acrylate, 2-perfluorodecylethyl (meth) acrylate, and 2-perfluorohexadecylethyl (meth) acrylate.

With respect to the (meth) acrylic ester polymer, vinyl monomers can be copolymerized together with a (meth) acrylic ester monomer. Examples of suitable vinyl monomers include styrene monomers such as styrene, vinyltoluene, alpha-methylstyrene, chlorostyrene, styrenesulfonic acid and its salts; fluorine-containing vinyl monomers such as perfluoroethylene, perfluoropropylene, and vinylidene fluoride; silicon-containing vinyl monomers such as vinyltrimethoxysilane and vinyltriethoxysilane; maleic anhydride, maleic acid, and monoalkyl and dialkyl esters of maleic acid; fumaric acid, and monoalkyl and dialkyl esters of fumaric acid; maleimide monomers such as maleimide; methylmaleimide; ethylmaleimide, propylmaleimide, butylmaleimide, hexylmaleimide, octylmaleimide, dodecylmaleimide, stearylmaleimide, phenylmaleimide, and cyclohexylmaleimide; nitrile group-containing vinyl monomers such as acrylonitrile and methacrylonitrile; amido group-containing vinyl monomers such as acrylamide and methacrylamide; vinyl esters such as vinyl acetate; vinyl propionate, vinyl pivalate, vinyl benzoate, and vinyl cinnamate; alkenes such as ethylene and propylene; conjugated dienes such as butadiene and isoprene; and vinyl chloride, vinylidene chloride, allyl chloride; and allyl alcohol. Any of these monomers may be used alone or any combination of them may be copolymerized with the (meth) acrylic acid monomer. In some embodiments, polymers comprising a styrene monomer and/or a (meth)acrylic acid monomer are desirable. In the above descriptions, (meth) acrylic acid means acrylic acid and/or methacrylic acid.

The (meth) acrylic ester polymer can be prepared, for example, by a conventionally known method. For example, a "living radical polymerization" method can be conveniently employed in order to obtain a (meth) acrylic ester polymer having narrow molecular weight distribution and low viscosity and having a reactive silicon group at a molecular chain end at a high ratio. An "atom transfer radical polymerization" method is a living radical polymerization method useful for polymerizing a (meth) acrylic ester monomer using, for example, an organic halide or a halogenated sulfonyl compound as an initiator and a transition metal complex as a catalyst. An atom transfer radical polymerization method advantageously has a wide range of options for the initiator and the catalyst. Because a halogen is located at a molecular chain end, which is relatively advantageous for a functional group conversion reaction, the atom transfer radical polymerization method is useful as a production method of the (meth) acrylic ester polymer having a specified functional group. Examples of the atom transfer radical polymerization method include the method disclosed in Krzysztof Matyjaszewski et al., J. Am. Chem. Soc, vol. 117, p. 5614 (1995) and the method disclosed in Japanese Kokai Publication H9-272714.

Other examples of a production method of the (meth) acrylic ester polymer having a reactive silicon group are production methods employing free radical polymerization methods using chain transfer agents and disclosed in Japanese Kokoku Publication H3-14068, Japanese Kokoku Publication H4-55444, and Japanese Kokai Publication H6-211922. The above-mentioned (meth) acrylic ester polymers having a reactive silicon group may be used alone or two or more kinds of them may be used in combination.

Examples of methods for producing an organic polymer involving blending a polyoxyalkylene polymer having a reactive silicon group with a (meth) acrylic ester polymer having a reactive silicon group include those disclosed in Japanese Kokai Publication S59-122541, S63-11264, H6-172631, and H11-116763. Further, a production method for a polyoxyalkylene polymer obtained by blending the (meth) acrylic ester polymer having a reactive silicon group may also include a method of polymerizing a (meth) acrylic ester monomer in the presence of a polyoxyalkylene polymer having a reactive silicon group. Examples of these methods include those disclosed in Japanese Kokai Publication 559-78223, Japanese Kokai Publication S59-168014, Japanese Kokai Publication S60-228516, and Japanese Kokai Publication 560-228517.

Some of the silyl terminated polymers useful in the air and water barrier articles according to the present disclosure are commercially available, for example, from Kaneka Corporation under the trade designations "KANEKA MS POLYMER" and "KANEKA SILYL", and from Union Carbide Specialty Chemicals Division under the trade designations "SILMOD-SAT10", "SILMOD SAT30", "SILMOD SAT 200", "SILMOD S203", "SILMOD S303", "SILMOD 20A", to name several, which were obtained from Union Carbide Company. It has been reported that resins available under the trade designation "SILMOD" have substantially the same chemistries as some resins available under the trade designations "MS" and "SILYL" from Kanegafuchi Kagaku Kogyo Kabushiki Kaisha, Osaka Japan. For example, the material available under trade designation "SILMOD S203" corresponds to the material available under trade designation "MS S203", the material available under trade designation "SILMOD S303" corresponds to the material available under trade designation "MS S303", and the material available under trade designation "SILMOD 20A" corresponds to the material available under trade designation "MS 20A". In further examples, the composition available under the trade designation "SILMOD SAT10" corresponds to the composition available under the trade designation "SILYL SAT10", the composition available under the trade designation "SILMOD SAT30" corresponds to the composition available under the trade designation "SILYL SAT30", and the composition available under the trade designation "SILMOD 200" corresponds to the composition available under the trade designation "SILYL 200".

Materials useful in the presently disclosed polymeric layer include solid materials and foam materials. In some embodiments, the foam material includes closed cell foams.

Polymeric materials useful for the air and water barrier articles of the present disclosure may optionally include various additives such as dehydrating agents, rheology additives, compatibilizers, tackifiers, physical property modifiers, photocurable substances, oxygen-curable substances, storage stability improving agents, fillers, epoxy resins, epoxy resin curing agents antioxidants, adhesion promoters, ultraviolet absorbers, metal deactivators, antiozonants, antioxidants, light stabilizers, lubricants, amine type radical chain inhibitors, phosphorus-containing peroxide decomposers, lubricants, pigments, foaming agents, solvents, flame retardants, antifungal agents, blowing agents, and antistatic agents, each in an adequate amount. These additives may be added singly to the polymeric material or two or more thereof may be added in combination to the polymeric material. Specific examples of these additives are disclosed in publications such as Japanese Kokoku Publications H4-69659 and H7-108928, and Japanese Kokai Publications S63-254149, S64-22904, 2001-72854, and 2008-303650.

In the polymeric layers useful for the air and water barrier articles of the present disclosure, at least one of UV stabilizers or antioxidants may be present in an amount from 0 to 5 parts per 100 parts of the silyl terminated polymer. These materials improve heat stability and UV resistance. Some useful UV stabilizers and antioxidants are commercially available, for example, those available under the trade designations "TINUVIN 770", "TINUVIN 327", "TINUVIN 1130" and "TINUVIN 292" from BASF, Florham Park, N.J.

In some embodiments, the polymeric layer useful for practicing the present disclosure includes at least 0.1 wt. %, in some embodiments at least 0.5 wt. % of one or more water scavengers, and at most 5 wt. %, in some embodiments at most 2 wt % of one or more water scavengers. Examples of suitable water scavengers include silanes such as vinyltrimethoxysilane, vinyltriethoxysilane, vinylmethyldimethoxysilane, O-methylcarbamatomethyl-methyldimethoxysilane, O-methylcarbamatomethyl-trimethoxysilane, O-ethylcarbamatomethyl-methyldiethoxysilane, O-ethylcarbamatomethyl-triethoxysilane, 3-methacryloyloxypropyl-trimethoxysilane, methacryloyloxymethyltrimethoxysilane, methacryloyloxymethylmethyldimethoxysilane, methacryloyloxymethyltriethoxysilane, methacryloxymethylmethyl-diethoxysilane, 3-acryloxyoylpropyl-trimethoxysilane, acryloyloxymethyltrimethoxysilane, acryloyloxymethylmethyldimethoxysilane, acrylmethyltriethoxysilane, acryloyloxymethylmethyldiethoxysilane, alkylalkoxysilanes in general, and further functionalized organosilanes and other aminosilanes, which are also described below as adhesion promoters.

In some embodiments, the polymeric materials useful for practicing the present disclosure include at least 0.1 wt %, in some embodiments, at least 0.5 wt %, of one or more adhesion promoters. In some embodiments, the presently disclosed polymeric materials include at most 5 wt %, in some embodiments, at most 2 wt %, of one or more adhesion promoters. Useful adhesion promoters include those available under the trade designations "A1120", "A187", and "A189" from OSI and "Z9020" from Dow Chemical. Amino silanes can be used as adhesion promoters. Examples of amino silane useful as adhesion promoters include gamma-aminopropyltrimethoxysilane, gamma-aminopropyltriethoxysilane, gamma-aminopropyltriisopropoxysilane, gamma-aminopropylmethyldimethoxysilane, gamma-aminopropylmethyldiethoxysilane, gamma-(2-aminoethyl)aminopropyltrimethoxysilane, gamma-(2-aminoethyl)aminopropylmethyldimethoxysilane, gamma-(2-aminoethyl) aminopropyltriethoxysilane, gamma-(2-aminoethyl) aminopropylmethyldiethoxysilane, gamma-(2-aminoethyl) aminopropyltriisopropoxysilane, gamma-(6-aminohexyl) aminopropyltrimethoxysilane, 3-(N-ethylamino)-2-methylpropyltrimethoxysilane, 2-aminoethylaminomethyltrimethoxysilane, N-cyclohexylaminomethyltriethoxysilane, N-cyclohexylaminomethyldiethoxymethylsilane, gamma-ureidopropyltrimethoxysilane, gamma-ureidopropyltriethoxysilane, N-phenyl-gamma-aminopropyltrimethoxysilane, N-phenylaminomethyltrimethoxysilane, N-benzyl-gamma-aminopropyltrimethoxysilane, N-vinylbenzyl-gamma-aminopropyltriethoxysilane, N,N'-bis[3-trimethoxysilyl]propyl]ethylenediamine, N-cyclohexylaminomethyltrimethoxysilane, N-cyclohexylaminomethyldimethoxymethylsilane, and N-phenylaminomethyltrimethoxysilane.

In some embodiments, the polymeric materials useful for practicing the present disclosure may comprise one or more catalysts. The catalyst may be present in the polymeric material in an amount of from about 0.05 wt % to about 5 wt %, in some embodiments from about 0.1 wt % to about 2 wt %, and in some embodiments, from about 0.1 wt % to about 1 wt %. Useful catalysts include organometallic compounds which are known as silanol condensation catalysts. The silanol condensation catalyst may be used in an amount of from about 0.01 to about 20 parts by weight per 100 parts by weight of the silyl-terminated polymer, in some embodiments, from about 0.1 to about 10 parts by weight per 100 parts by weight of the silyl-terminated polymer. Examples of suitable silanol condensation catalysts include titanate esters such as tetrabutyl titanate and tetrapropyl titanate; organotin compounds such as dibutyltin dilaurate, dibuytltin maleate, dibutyltin diacetate, stannous octylate, stannous napthenate, reaction products from dibutyltin oxide and phthalate esters, and dibutyltin diacetylacetonate; organoaluminum compounds such as aluminum trisacetylacetonate, aluminum tris(ethylacetoacetate) and diisopropocyaluminum ethyl acetoacetate; reaction products from bismuth salts and organic carboxylic acids, such as bismuth tris(2-ethylhexonate) and bismuth tris(neodecanoate); chelate compounds such as zirconium tetra-acetylacetonate and titanium tetra-acetylactonate; organolead compounds such as lead octylate; organovanadium compounds; amines such as butylamine, octylamine, dibutylamine, monoethanolamine, oleylamine, cyclohexylamine, benzylamine, diethylaminopropylamine, xylenediamine, triethylenediamine, guanidine, diphenylguanidine, 2,4,6-tris(dimethylaminomethyl)phenol, morpholine, N-methylmorpholine, 2-ethyl-4-methylimidazole with carboxylic or other acids; low-molecular-weight polyamide resins derived from excess polyamines and polybasics acids; and reaction products from excess polyamines and epoxy compounds. Any of these may be used individually or in combination.

In some embodiments, polymeric materials useful for practicing the present disclosure comprise one or more pigments or fillers. Useful fillers are typically solids that are non-reactive with the other components of the polymeric material, porous material, and coating compositions. Useful fillers include, for example, clay, talc, dye particles, pigments and colorants (for example, titanium dioxide and carbon black), glass beads, metal oxide particles, silica particles, ceramic microspheres, hollow polymeric microspheres (such as those available under the trade designation "EXPANCEL 551 DE" from Akzo Nobel, Duluth, Ga.), hollow glass microspheres (such as those available under the trade designation "K37" from 3M Co., St Paul, Minn.), carbonates, metal oxides, silicates (e.g. talc, asbestos, clays, mica), sulfates, silicon dioxide and aluminum trihydrate. Some specific examples include ground or light calcium carbonate (with or without a surface-treatment such as a fatty acid, resin acid, cationic surfactant, or anionic surfactant); magnesium carbonate; talc; sulfates such as barium sulfate; alumina; metals in powder form (e.g., aluminum, zinc and iron); bentonite; kaolin clay; quartz powder; and combinations of two or more of these.

Examples of useful organic pigments include halogenated copper phthalocyanines, aniline blacks, anthraquinone blacks, benzimidazolones, azo condensations, arylamides, diarylides, disazo condensations, isoindolinones, isoindolines, quinophthalones, anthrapyrimidines, flavanthrones, pyrazolone oranges, perinone oranges, beta-naphthols, arylamides, quinacridones, perylenes, anthraquinones, dibromanthrones, pyranthrones, diketopyrrolo-pyrrole pigments (DPP), dioxazine violets, copper and copper-free phthalocyanines, and indanthrones.

Examples of useful inorganic pigments include titanium dioxide, zinc oxide, zinc sulphide, lithopone, antimony oxide, barium sulfate, carbon black, graphite, black iron oxide, black micaceous iron oxide, brown iron oxides, metal complex browns, lead chromate, cadmium yellow, yellow oxides, bismuth vanadate, lead chromate, lead molybdate, cadmium red, red iron oxide, Prussian blue, ultramarine, cobalt blue, chrome green (Brunswick green), chromium oxide, hydrated chromium oxide, organic metal complexes, and laked dye pigments.

The filler can also comprise conductive particles (see, for example, U.S. Patent Application Pub. No. 2003/0051807, which is incorporated herein by reference) such as carbon particles or metal particles of silver, copper, nickel, gold, tin, zinc, platinum, palladium, iron, tungsten, molybdenum, solder or the like, or particles prepared by covering the surface of these particles with a conductive coating of a metal or the like. It is also possible to use non-conductive particles of a polymer such as polyethylene, polystyrene, phenol resin, epoxy resin, acryl resin or benzoguanamine resin, or glass beads, silica, graphite or a ceramic, whose surfaces have been covered with a conductive coating of a metal.

In some embodiments, the polymeric material includes inorganic solids such as talc, titanium dioxide, silica, zirconia, calcium carbonate, calcium magnesium carbonate, glass or ceramic microspheres, or combinations thereof. In some embodiments, the polymeric material includes at least one of titanium dioxide or calcium carbonate.

In some embodiments, the polymeric material useful for practicing the present disclosure comprises a plasticizer. In some of these embodiments, the plasticizer does not contain any groups reactive toward silane/alkoxysilane. Examples of suitable plasticizers for the polymeric material include which polyethers, polyether esters, esters of organic carboxylic acids or anhydrides thereof, such as phthalates (e.g., dialkyl phthalates such as di-(2-ethyl-hexyl)-phthalates, dibutyl phthalate, diethyl phthalate, dioctyl phthalate, butyl octyl phthalate, dicyclohexyl phthalate, butyl benzyl phthalate, dioctyl phthalate, diisononyl phthalate, and diisodecyl phthalate); adipates (e.g., di-(2-ethylhexyl)adipate, diisooctyl adipate, octyl decyladipate; and dioctyl adipate); alkyl azelates (e.g., di(2-ethylhexyl)azelate and di-(2-ethylbutyl) azelate); and dialkyl sebacates (e.g., dibutyl sebacate, dioctylsebacate, and diisooctyl sebacate). Other suitable plasticizers include phosphates such as triaryl phosphates (e.g., tricresyl phosphate, triphenyl phosphate, cresyl(liphenyl phosphate); trialkyl phosphates (e.g., trioctyl phosphate and tributyl phosphate); alkoxyalkyl phosphates (e.g., trisbutoxyethyl phosphate); and alkyl aryl phosphates (e.g., octyldiphenyl phosphate); citrates such as acetyl tri-n-butyl citrate, acetyl triethyl citrate, monoisopropyl citrate, triethyl citrate, mono-, di-, and tri-stearyl citrate; triacetin; p-tert-butyl; n-octyl benzoate; 2-ethylhexyl benzoate; isooctyl benzoate; n-nonyl benzoate; n-decyl benzoate; isodecyl benzoate; 2-propylheptyl benzoate; n-undecyl benzoate; isoundecyl benzoate; n-dodecyl benzoate; isododecyl benzoate; isotridecyl benzoate; n-tridecyl benzoate; triisononyl trimellitate; $C_{13}$-rich $C_{11}$-$C_{14}$-alkyl benzoates, and combinations thereof. In some embodiments, plasticizers useful for practicing the present disclosure include esters, such as triethylene glycol bis (2-ethylhexanoate) commercially available under the trade designation "Eastman TEG-EH" from Eastman. In some embodiments, at least one of diethylene glycol monobenzoate, diethylene glycol dibenzoate, propylene glycol monobenzoate, propylene glycol dibenzoate, polypropylene glycol monobenzoate, polypropylene glycol dibenzoate can be used individually or in combination with any of the aforementioned plasticizers.

The amount of plasticizer employed, if one is employed, will depend on the nature of the polymeric resin and the plasticizer.

The polymeric material useful for practicing the present disclosure may comprise one or more organic solvents. Examples of suitable solvents include non-reactive compounds which may be aliphatic, aromatic, or araliphatic. Examples of suitable solvents include methoxypropyl acetate, methoxyethyl acetate, ethylene glycol diacetate, propylene glycol diacetate, glyme, diglyme, dioxane, tetrahydrofuran, dioxolane, tert-butyl methyl ether, ethyl acetate, butyl acetate, chloroform, methylene chloride, chlorobenzene, o-dichlorobenzene, anisole, 1,2-dimethoxybenzene, phenyl acetate, N-methyl-2-pyrrolidone, dimethylformamide, N,N-dimethylacetamide, dimethyl sulphoxide, acetonitrile, phenoxyethyl acetate, and combinations of two or more of these. In some embodiments, the solvent comprises at least one of methoxypropyl acetate, acetone, 2-butanone, xylene, toluene, cyclohexanone, 4-methyl-2-pentanone, 1-methoxyprop-2-yl acetate, ethylene glycol monomethyl ether, 3-methoxy-n-butyl acetate, white spirit, more highly substituted aromatics such as those commercially available, for example, under the trade designations "NAPTHA", "SOLVESSO", "ISOPAR", "NAPPAR" from Deutsche EXXON CHEMICAL GmbH, Cologne, DE; "SHELLSOL" from Deutsche Shell Chemie GmbH, Eschborn, DE; methyl n-amyl ketone ("MAK") and "AROMATIC 100" "AROMATIC 150" from ExxonMobile Chemical; xylene, methyl isobutyl ketone ("MIBK"), and ethyl 3-ethoxypropionate from Eastman Chemical Company.

Additional compositions useful for the polymeric material useful for practicing the present disclosure can be found in Int. Pat. Appl. Pub. Nos. WO 2015/126931 (Seabaugh et al.) and WO 2015/183354 (Widenbrant et al.), the examples of which are incorporated herein by reference.

Pressure Sensitive Adhesive

In some embodiments, the air and water barrier articles according to the present disclosure are self-adhering, comprising an adhesive layer, in some embodiments, a pressure sensitive adhesive (PSA) material. PSAs are well known to those of ordinary skill in the art to possess properties including the following: (1) aggressive and permanent tack, (2) adherence with no more than finger pressure, (3) sufficient ability to hold onto an adherend, and (4) sufficient cohesive strength to be cleanly removable from the adherend. Materials that have been found to function well as PSAs are polymers designed and formulated to exhibit the requisite viscoelastic properties resulting in a desired balance of tack, peel adhesion, and shear holding power.

A variety of pressure sensitive adhesives are useful for adhering air and water barrier articles to architectural structures (e.g., buildings) and building components, for example. These include both water vapor permeable and water vapor impermeable pressure sensitive adhesives. An example of the latter is a rubber modified asphalt (bitumen) pressure sensitive adhesive or a synthetic rubber pressure sensitive adhesive. Such pressure sensitive adhesives are well known in the art and understood to be water vapor impermeable. Further examples of suitable PSAs include natural rubber-, acrylic-, block copolymer-, silicone-, polyisobutylene-, polyvinyl ether-, polybutadiene-, or and urea-based pressure sensitive adhesive and combinations thereof. These PSAs can be prepared, for example, as described in Adhesion and Adhesives Technology, Alphonsus V. Pocius, Hanser/Gardner Publications, Inc., Cincinnati, Ohio, 1997, pages 216 to 223, Handbook of Pressure Sensitive Adhesive Technology, Donatas Satas (Ed.), 2nd Edition, Van Nostrand Reinhold, New York, N.Y., 1989, Chapter 15, and U.S. Pat. No. Re 24,906 (Ulrich).

In some embodiments, the adhesive is selected to be a solventless or hot melt adhesive. In some embodiments, solvent based adhesives or water based adhesives may be used. Examples of suitable adhesives include radiation-cured (e.g., ultraviolet (UV) radiation or electron-beam cured (co)polymers resulting from polymerizable monomers or oligomers) may be used. Suitable hot melt adhesives may contain (co)polymers such as butyl rubber, styrene-butadiene-styrene (SBS), styrene-isoprene-styrene (SIS), styrene butadiene (SB), styrene-ethylene-butadiene-styrene (SEBS), and ethylene/vinylacetate (EVA). Tackifying resins, which generally refer to materials that are compatible with the elastomer and have a number average molecular weight of up to 10,000 grams per mole, are typically added to these elastomers. Useful tackifying resins can have a softening point of at least 70° C. as determined using a ring and ball apparatus and a glass transition temperature of at least −30° C. as measured by differential scanning calorimetry. In some embodiments, the tackifying resin comprises at least one of rosin, a polyterpene (e.g., those based on α-pinene, β-pinene, or limonene), an aliphatic hydrocarbon resin (e.g., those based on cis- or trans-piperylene, isoprene, 2-methyl-but-2-ene, cyclopentadiene, dicyclopentadiene, or combinations thereof), an aromatic resin (e.g. those based on styrene, α-methyl styrene, methyl indene, indene, coumarone, or combinations thereof), or a mixed aliphatic-aromatic hydrocarbon resin. Any of these tackifying resins may be hydrogenated (e.g., partially or completely). Natural and petroleum waxes, oil, and bitumen may be useful as additives to the pressure sensitive adhesive composition.

In some embodiments, PSAs compositions that are useful in the roll and method according to the present disclosure are acrylic PSAs. As used herein, the term "acrylic" or "acrylate" includes compounds having at least one of acrylic or methacrylic groups. Useful acrylic PSAs can be made, for example, by combining at least two different monomers including certain of the second monomers described above. Examples of suitable second monomers include 2-methylbutyl acrylate, 2-ethylhexyl acrylate, isooctyl acrylate, lauryl acrylate, n-decyl acrylate, 4-methyl-2-pentyl acrylate, isoamyl acrylate, sec-butyl acrylate, isononyl acrylate, and methacrylates of the foregoing acrylates. Examples of suitable additional monomers useful for preparing acrylic PSAs include a (meth)acrylic acid (e.g., acrylic acid, methacrylic acid, itaconic acid, maleic acid, and fumaric acid), a (meth)acrylamide (e.g., acrylamide, methacrylamide, N-ethyl acrylamide, N-hydroxyethyl acrylamide, N-octyl acrylamide, N-t-butyl acrylamide, N,N-dimethyl acrylamide, N,N-diethyl acrylamide, N-ethyl-N-dihydroxyethyl acrylamide, and methacrylamides of the foregoing acrylamides), a (meth)acrylate (e.g., 2-hydroxyethyl acrylate or methacrylate, cyclohexyl acrylate, t-butyl acrylate, isobornyl acrylate, and methacrylates of the foregoing acrylates), N-vinyl pyrrolidone, N-vinyl caprolactam, an alpha-olefin, a vinyl ether, an allyl ether, a styrenic monomer, or a maleate. In some embodiments, the PSA in the composition according to the present disclosure includes a pendent carboxylic acid group incorporated into the PSA by including, for example, acrylic acid, methacrylic acid, itaconic acid, maleic acid, or fumaric acid in the preparation of the PSA.

Acrylic PSAs may also be made by including crosslinking agents in the formulation. Examples of cross-linking agents include copolymerizable polyfunctional ethylenically unsaturated monomers (e.g., 1,6-hexanediol diacrylate, trimethylolpropane triacrylate, pentaerythritol tetraacrylate, and 1,2-ethylene glycol diacrylate); ethylenically unsaturated compounds which in the excited state are capable of abstracting hydrogen (e.g., acrylated benzophenones such as described in U.S. Pat. No. 4,737,559 (Kellen et al.), p-acryloxy-benzophenone, which is available from Sartomer Company, Exton, Pa., monomers described in U.S. Pat. No. 5,073,611 (Rehmer et al.) including p-N-(methacryloyl-4-oxapentamethylene)-carbamoyloxybenzophenone, N-(benzoyl-p-phenylene)-N'-(methacryloxymethylene)-carbodiimide, and p-acryloxy-benzophenone); nonionic crosslinking agents which are essentially free of olefinic unsaturation and is capable of reacting with carboxylic acid groups, for example, in the third monomer described above (e.g., 1,4-bis(ethyleneiminocarbonylamino)benzene; 4,4-bis(ethyleneiminocarbonylamino)diphenylmethane; 1,8-bis(ethyleneiminocarbonylamino)octane; 1,4-tolylene diisocyanate; 1,6-hexamethylene diisocyanate, N,N'-bis-1,2-propyleneisophthalamide, diepoxides, dianhydrides, bis(amides), and bis(imides)); and nonionic crosslinking agents which are essentially free of olefinic unsaturation, are noncopolymerizable with the first and second monomers, and, in the excited state, are capable of abstracting hydrogen (e.g., 2,4-bis(trichloromethyl)-6-(4-methoxy)phenyl)-s-triazine; 2,4-bis(trichloromethyl)-6-(3,4-dimethoxy)phenyl)-s-triazine; 2,4-bis(trichloromethyl)-6-(3,4,5-trimethoxy)phenyl)-s-triazine; 2,4-bis(trichloromethyl)-6-(2,4-dimethoxy)phenyl)-s-triazine; 2,4-bis(trichloromethyl)-6-(3-methoxy)phenyl)-s-triazine as described in U.S. Pat. No. 4,330,590 (Vesley); 2,4-bis(trichloromethyl)-6-naphthenyl-s-triazine and 2,4-bis(trichloromethyl)-6-(4-methoxy)naphthenyl-s-triazine as described in U.S. Pat. No. 4,329,384 (Vesley)).

Typically, the second monomer is used in an amount of 80-100 parts by weight (pbw) based on a total weight of 100 parts of copolymer, and an additional monomer as described above is used in an amount of 0-20 pbw based on a total weight of 100 parts of copolymer. The crosslinking agent can be used in an amount of 0.005 to 2 weight percent based on the combined weight of the monomers, for example from about 0.01 to about 0.5 percent by weight or from about 0.05 to 0.15 percent by weight.

The acrylic PSAs useful for practicing the present disclosure can be prepared, for example, in solvent or by a solvent free, bulk, free-radical polymerization process (e.g., using heat, electron-beam radiation, or ultraviolet radiation). Such polymerizations are typically facilitated by a polymerization initiator (e.g., a photoinitiator or a thermal initiator). The polymerization initiator is used in an amount effective to facilitate polymerization of the monomers (e.g., 0.1 part to about 5.0 parts or 0.2 part to about 1.0 part by weight, based on 100 parts of the total monomer content).

If a photocrosslinking agent is used, the coated adhesive can be exposed to ultraviolet radiation having a wavelength of about 250 nm to about 400 nm. The radiant energy in this range of wavelength required to crosslink the adhesive is about 100 millijoules/cm$^2$ to about 1,500 millijoules/cm$^2$, or more specifically, about 200 millijoules/cm$^2$ to about 800 millijoules/cm$^2$.

A useful solvent-free polymerization method is disclosed in U.S. Pat. No. 4,379,201 (Heilmann et al.). Initially, a mixture of second and third monomers can be polymerized with a portion of a photoinitiator by exposing the mixture to UV radiation in an inert environment for a time sufficient to form a coatable base syrup, and subsequently adding a crosslinking agent and the remainder of the photoinitiator. This final syrup containing a crosslinking agent (e.g., which may have a Brookfield viscosity of about 100 centipoise to about 6000 centipoise at 23° C., as measured with a No. 4 LTV spindle, at 60 revolutions per minute) can then be coated onto a substrate, for example, a polymeric film substrate. Once the syrup is coated onto the substrate, for example, the polymeric film substrate, further polymerization and crosslinking can be carried out in an inert environment (e.g., nitrogen, carbon dioxide, helium, and argon, which exclude oxygen). A sufficiently inert atmosphere can be achieved by covering a layer of the photoactive syrup with a polymeric film, such as silicone-treated PET film, that is transparent to UV radiation or e-beam and irradiating through the film in air.

Solvent-based adhesives may contain ingredients such as those listed above, dissolved or dispersed in a solvent vehicle. Water based adhesives would normally be based on emulsions of (co)polymeric materials. Suitable (co)polymeric materials include vinyl acetate and (meth)acrylic homopolymers and copolymers. The phrase "(meth)acrylic homopolymers and copolymers" is typically used to mean homopolymers and copolymers of one or more (meth) acrylic esters (and acids) only, ethylene/vinyl acetate as well as styrene/acrylic, vinyl chloride/acrylic, vinyl versatate and others. Water based adhesives may have the disadvantage that they generally require the additional use of drying ovens or heat lamps to evaporate the water.

If a water vapor permeable pressure sensitive adhesive is used, the air and water barrier article may be completely coated on one side. If a water vapor impermeable pressure sensitive adhesive is used, then the air and water barrier article is desirably only partially coated with adhesive, typically in the range of about 10% to 90%, more typically about 30% to 80%, most typically 40% to 70%, of the surface area of the article. In other words, at least 10% to 90%, in some embodiments 20% to 70% or 30% to 60%, of the surface area of the air and water barrier article is typically adhesive-free in order to maintain sufficient water vapor permeability of the article.

The adhesive may suitably be applied to the air and water barrier article at a thickness of 0.001 inches to 0.1 inch (about 0.0254-2.54 millimeters). In some embodiments, the pressure sensitive adhesive is applied at a thickness of 0.003 inches to 0.025 inches (about 0.0762-0.635 mm) or at a thickness of 0.005 inches to 0.02 inches (about 0.127-0.508 mm).

Adhesive Patterns

In some embodiments, the pressure sensitive adhesive is impermeable to water vapor. In some of these embodiments, to retain a desired level of water vapor permeance in the air and water barrier articles, the adhesive is applied to the air and water barrier article in a discontinuous manner in order to leave portions of the major outer surface of the air and water barrier article uncoated with adhesive.

In order to prevent the lateral movement of air between the air and water barrier article and the substrate to which it is bonded, and through lap joints of the air and water barrier article, the adhesive coated areas of the air and water barrier article can be made to intersect to isolate the uncoated areas, thereby eliminating channels through which air can laterally move. This can be achieved by any number of patterns, such as intersecting circles with adhesive free centers, intersecting squares or rectangles of adhesive, intersecting strips in a checkered pattern, etc.

The adhesive may suitably be applied so as to cover 5% to 99% of the area of one side of the air and water barrier article. In some embodiments, it is applied to cover between 10% and 90% of the area, in some embodiments between 30% to 80% or 40% to 70% of the area, to obtain a balance of adhesion and water vapor permeance for the article.

Partial coatings of adhesive may be applied in a random fashion or in a specific pattern. Some examples of partial coatings of adhesive are described, for example, in U.S. Pat. No. 3,039,893 (Banigan, Jr.), U.S. Pat. No. 3,426,754 (Bierenbaum), U.S. Pat. No. 5,374,477 (Lawless), U.S. Pat. No. 5,593,771 (Lawless), U.S. Pat. No. 5,895,301 (Porter), U.S. Pat. No. 6,495,229 (Carte), and U.S. Pat. No. 6,901,712 (Lionel). In some embodiments, the adhesive is provided from dispensing outlets on a first distribution manifold and a second distribution manifold. The first distribution manifold can move while the second distribution manifold is kept stationary. Further details about this method can be found, for example, in Int. Pat. Appl. Pub. No. WO 2015/126645 (Maier et al.) and WO 2015/126931 (Seabaugh et al.), the disclosure of which is incorporated by reference in its entirety herein.

Liner

Air and water barrier articles according to the present disclosure include a liner. Various liners may be useful in the linered air and water barrier article according to the present disclosure. In some embodiments, the liner comprises at least one of a polyester film, polyethylene film, polypropylene film, polyolefin coated polymer film, polyolefin coated paper, acrylic coated polymer film, and polymer coated kraft paper. The polyolefin coated film or paper may be polyethylene coated film or paper. Examples of suitable commercially available liners include those available under the trade designations "2.0 CL PET U4162/U4162" and "4 BU DHP UE1094B/000" from Loparex, Hammond, Wis. and a red pigmented, multilayer, thermoplastic olefin film containing a proprietary blend of high density polyethylene and low density polyethylene, having a thickness of about 63 micrometers (0.0025 inches), commercially available from Iso Poly Films, Incorporated, Gray Court, S.C.

Figure 7:
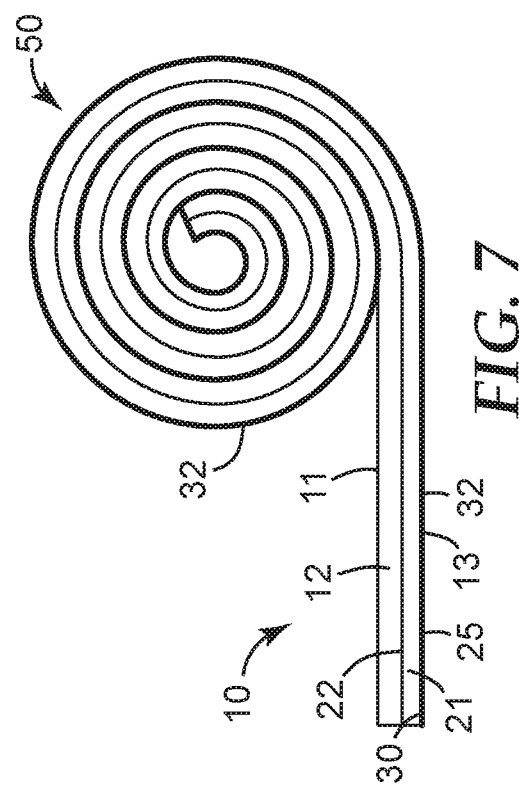
FIG. 7 is a side cross section view of an embodiment of a roll of a linered air and water barrier article according to the present disclosure.

Referring now to FIG. 7, the present disclosure provides a linered air and water barrier article 50 comprising an air and water barrier article 21 according to the embodiment disclosed in FIG. 2 and the corresponding text herein. In some embodiments, the linered air and water barrier article 50 is a rolled article as shown in FIG. 7. In some embodiments a peel adhesion between the second major surface 32 of the liner 25 and the pressure sensitive adhesive 12 is less than or equal to a peel adhesion between the first major surface 30 of the liner 25 and the second major surface 13 of the air and water barrier article 21. In some embodiments, the liner 25 is coated on at least one of the major surfaces 30, 32 with a release coating. In some embodiments, surface modification is optionally used at the interface between the second major surface 13 of the article 21 and the first major surface 30 of the liner 25.

In some embodiments, the liner 25 is coated on at least one of its major surfaces 30, 32 with a release coating. In some embodiments both major surfaces 30, 32 of the liner 25 are coated with a release coating. In this case, the release coating may the same or different on each of the major surfaces 30, 32 of the liner 25. Examples of materials useful as release coatings for the liners disclosed herein include acrylics, silicones, siloxanes, fluoropolymers, and urethanes. For example, in some embodiments, a liner useful in the roll according to the present disclosure is a polyolefin-coated polyester film with silicone treatment on one side, such as those commercially available under the trade designation "48 #CL PET H/H UE1095/000" from Loparex, Hammond, Wis. In some embodiments, one side may have a silicone coating and the other an acrylic coating. A silicone coating may be useful for facilitating release of the pressure sensitive adhesive, while the acylic coating may have higher peel adhesion to at least a portion of the air and water barrier article (e.g., the polymeric layer).

The liner may be produced using a variety of processing techniques. For example, liner processing techniques such as those disclosed in U.S. Pat. Appl. No. 2013/0059105 (Wright et al.) may be useful to produce a liner suitable for practicing the present disclosure. A suitable liner processing technique may include applying a layer comprising a (meth) acrylate-functional siloxane to a major surface of a substrate and irradiating that layer in a substantially inert atmosphere comprising no greater than 500 ppm oxygen with a short wavelength polychromatic ultraviolet light source having at least one peak intensity at a wavelength of from about 160 nanometers to about 240 nanometers. Irradiating can at least partially cure the layer. In some embodiments, the layer is cured at a curing temperature greater than 25° C. The layer may be at a temperature of at least 50° C., 60° C. 70° C., 80° C., 90° C., 100° C., 125° C., or at least 150° C., in some embodiments, no more than 250° C., 225° C., 200° C., 190° C., 180° C., 170° C., 160° C., or 155° C.

In some embodiments, liner can be surface treated (e.g., at least on the first major surface) to increase tack or adhesion between the liner and the polymeric material. Examples of materials or surface treatments useful for increase tack or adhesion between the polymeric material and the first major surface of the liner include any chemical or physical surface modifications to any of the polymeric material, the first major surface of the liner, or both. For example, a chemical surface modifier can be used. In some embodiments, adhesion modification can be accomplished by selecting a specific liner surface morphology to increase surface area and physical interlocking of the polymeric material.

In many embodiments, the liner is impermeable to water vapor. In these embodiments, the liner can peeled away from the air and water barrier article after the air and water barrier article is applied to a surface (e.g., a surface of a building component). In other embodiments, at least a portion of the liner is not removed from the air and water barrier article as described in further detail below.

Coating Composition

In some embodiments of the linered air and water barrier article according to the present disclosure, the article includes a coating composition disposed between at least a portion of the polymeric layer and the liner. The coating composition has a different peel adhesion to the liner than the polymeric layer. In some embodiments, the coating composition has a first peel adhesion to the liner that is lower than a second peel adhesion between the polymeric layer and the liner. Therefore, the coating composition may be useful for reducing tack or adhesion between the polymeric material and the liner. Generally, the coating composition is not tacky and therefore would not be considered a PSA.

Useful coating compositions include any of a variety of materials that are typically non-tacky and can be disposed between the polymeric material and the liner. Examples of suitable coating compositions include inks, release coatings, and slip coatings. In some embodiments, the coating composition comprises at least one of a polyamide, a polyurethane, a silyl-terminated polyether, a vinyl polymer, an acrylic polymer, or a nitrocellulose polymer. A useful silyl-terminated polyether can be prepared as a polymeric material described above, for example, and increasing the amount of inorganic filler in the polymeric material can decrease its peel adhesion to the liner.

In some embodiments, the coating composition can be selected from commercially available materials. For example, useful coating compositions include a liquid, white ink available under the trade designation "DT OPAQUE WHITE" from Sun Chemical Corporation, Carlstadt, N.J., a liquid, red ink available under the trade designation "SUN-SPECTRO SB TRUWEATHER YS RED" from Sun Chemical Corporation, a vinyl, white ink available under the trade designation 13W1541 SOLVENT VINYLWHITE from Penn Color, Doylestown, Pa., a water-based ink dispersion of titanium dioxide and binder resin, available under the trade designation SPPFW1836936/G267 from Sun Chemical Corporation, a water-based polyurethane dispersion, available under the trade designation PERMAX 202 from The Lubrizol Corporation, Cleveland, Ohio, and a solvent-based polyamide primer, available under the trade designation POLYURETHANE PROTECTIVE TAPE ADHESION PROMOTER 86A from 3M Company, St. Paul, Minn.

Figure 8:
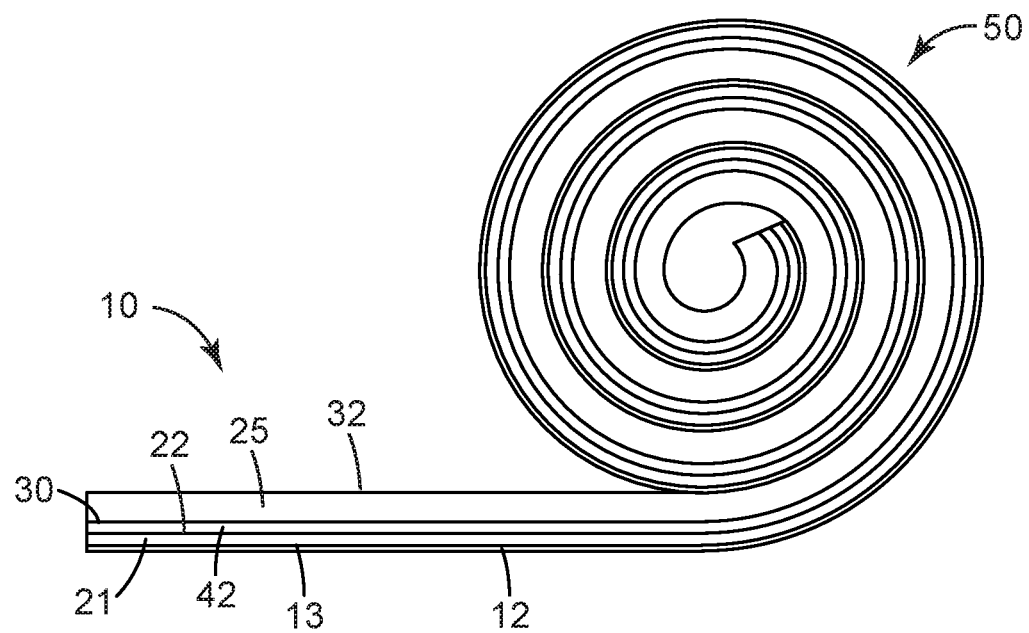
FIG. 8 is a side cross section view of another embodiment of a roll of a linered air and water barrier article according to the present disclosure.

Referring now to FIG. 8, the present disclosure provides a linered air and water barrier article 21 having opposing first and second major surfaces 22, 13, a pressure sensitive adhesive 12 disposed on at least the first major surface 13 of the article 21, a coating composition 42 disposed on the second major surface 22 of the article 21, and a liner 25 having a first major surface 30 that contacts the coating composition 42. The pressure sensitive adhesive 12 contacts a second major surface 32 of the liner 25 when wound up in the roll. The coating composition 42 has a first peel adhesion to the first major surface 30 of the liner 25 that is lower than a peel adhesion between the polymeric layer and the first major surface 30 of the liner 25. The peel adhesion between the second major surface 32 of the liner 25 and the pressure sensitive adhesive 12 is generally less than or equal to the peel adhesion between the first major surface 30 of the liner 25 and the coating composition 42 and/or the polymeric material on the air and water barrier article 21.

In these embodiment, the air and water barrier article need not pass Modified Test 1 of ASTM D-1970/D-1970M-13 or Modified Test 2 of ASTM D-1970/D-1970M-13, or Modified Test 3 of ASTM D-1970/D-1970M-13. For example, if the air and water barrier article is used as a window sill tape as described below, it may be flashed over another air and water barrier article that passes at least one of Modified Test 1 of ASTM D-1970/D-1970M-13 or Modified Test 2 of ASTM D-1970/D-1970M-13, or Modified Test 3 of ASTM D-1970/D-1970M-13.

FIG. 8 illustrates a roll wound with the pressure sensitive adhesive on the outside of the roll, which is useful for applying the roll to a building component since the roll does not have to first be unwound. In other embodiments, the roll may be wound with the pressure sensitive adhesive on the inside of the roll as shown in FIG. 7.

Figure 9:
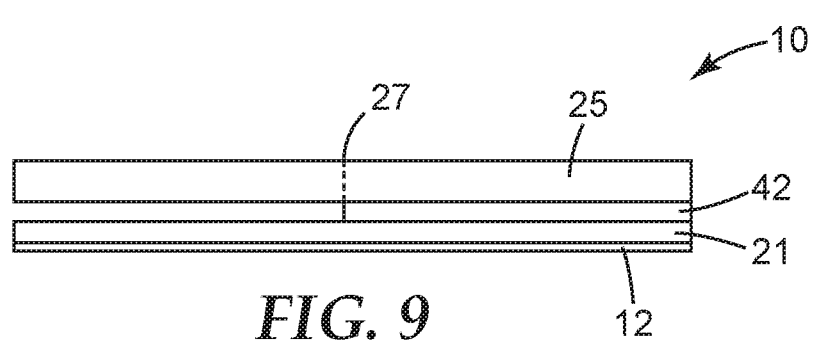
FIG. 9 is an end cross section view of an embodiment of a roll of a linered air and water barrier article according to the present disclosure having a coating composition.

Referring now to FIG. 9, which is an end cross-section view of the roll 50 described as multilayer construction 10, coating composition 42 is disposed between a portion of the liner 25 and the air and water barrier article 21. Coating composition 42 can be positioned in various configurations and can have various widths relative to the air and water barrier article. The liner 25 and air and water barrier article 21 can contact each other in the portion of the linered air and water barrier article that does not include a coating composition. It is also possible to have first and second coating compositions, each having a different peel adhesion to the liner 25. Also shown in FIG. 9 is perforation 27 in the liner 25. In some embodiments, the liner is slit at a location corresponding to an edge of the coating composition 42. The edge of the coating composition is where the coating composition stops when it does not extend for the entire width of the air and water barrier article. In some embodiments, the perforation 27 is within one centimeter, 5 millimeters (mm), 4 mm, 3 mm, 2 mm, or 1 mm of the edge of the coating composition 42. The perforation may be made in the liner by controlled-depth slitting.

A variety of slitting methods may be useful for slitting the liner, for example, rotary cutting or laser cutting. For perforations using a rotary cutter, the cutter may have notches to leave some of the liner unslit to make perforation 27.

Figure 10:
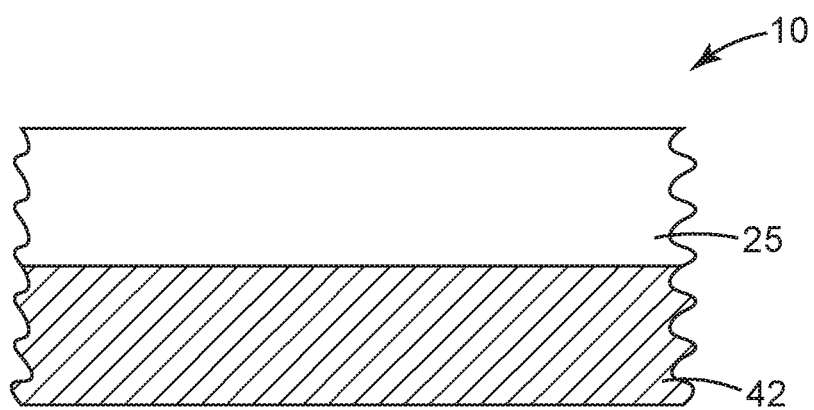
FIG. 10 is a top view of a portion of a linered air and water barrier article according to the present disclosure.

FIG. 10 is a top plan view of an embodiment of the multilayer article 10 shown in FIG. 9 after a portion of the liner 25 has been removed. In this view, the liner 25 covers a portion of the air and water barrier article but does not cover the coating composition 42. In some embodiments, the liner extends to the location of the edge of the coating composition, as this location is defined above in any of its embodiments. In FIG. 10, coating composition 42 extends along one side of the article 10 in the machine direction and liner 25 extends along the opposite side of the article 10 in the machine direction. In some embodiments, including the illustrated embodiment, coating composition forms at least one continuous strip extending along the length of the roll. In some embodiments, the coating composition is discontinuous.

Although FIG. 9 illustrates that the liner is perforated, the liner can also be torn without first being perforated, for example, if it has been stretched in the machine direction. In these embodiments, the liner may also be cut without first being perforated.

As shown in the Examples, below, the coating composition can influence the peel adhesion between the air and water barrier article and the liner. In some embodiments, the peel adhesion between the air and water barrier article and the liner is at least 15, 20, or 25 N/dm. The liner can be more easily removed from the air and water barrier article where it overlays the coating composition but can remain adhered to the air and water barrier article at other locations. The peel adhesions can be determined as described in the Examples below.

Any suitable coating method may be useful for applying the coating compositions to the air and water barrier article and/or the liner. For example, spray coating and gravure coating may be useful.

Applications

In some embodiments, the presently disclosed air and water barrier article has a moisture vapor transmission rate of 1 perms or more according to ASTM E96 method. In some embodiments, the presently disclosed air and water barrier article has a moisture vapor transmission rate of 5 perms or more according to ASTM E96 method. In some embodiments, the article has a permeability of greater than 10 perms according to ASTM E 96. In some embodiments, thicknesses of the different layers used in the air and water barrier article are varied to achieve desired permeability of the article.

In some embodiments, the presently disclosed air and water barrier article is applied on an exterior sheathing layer, which is commonly plywood, oriented strand board (OSB), foam insulation sheathing, nonwoven glass mat faced gypsum sheathing board, or other conventional sheathing materials commonly used in the construction industry. Useful exterior cladding layer is made up of brick, concrete blocks, reinforced concrete, stone, vinyl siding, fiber cement board, clapboard, metal panels, or other known exterior siding materials. In some embodiments, the air and water barrier article is applied to a roofing deck, an attic floor or other attic surface, a boundary between a wall, roof system, and/or foundation, other interior or exterior surfaces of a structure, or used as flashing around a roof penetration.

Building components include panels and other constructions before, during, or after they become part of an architectural structure.

The air and water barrier article according to the present disclosure can be applied to a building component by adhering at least a portion of the pressure sensitive adhesive on the roll in any of the above embodiments to a surface of an building component, so that the air and water barrier article is affixed to the surface of the building component. When the roll is unwound, the liner releases from the pressure sensitive adhesive and remains adhered to at least the second coating composition on the air and water barrier article (and in some cases the first coating composition) even when a peel adhesion between the second major surface of the liner and the pressure sensitive adhesive is equal to the second peel adhesion. Adhering the roll to the building component can be carried out before or after the roll is unwound. In some embodiments, the roll is adhered to the building component before it is unwound. In some embodiments, the roll is at least partially unwound before it is adhered to the building component. In embodiments in which the roll is wound with the pressure sensitive adhesive on the inside of the roll, as shown in FIG. 7, the roll may be unwound at least partially before the roll is adhered to the building component.

Next the liner can be peeled away from the air and water barrier article. Peeling the liner away from the first and second coating composition is optional and depends on whether a water vapor permeable liner is used and whether water vapor permeability is desired.

In some embodiments, including the embodiment illustrated in FIGS. 9 and 10, the liner is removed from a portion of the air and water barrier article while leaving a portion of the liner disposed on the major surface of the polymer layer. When the liner is impermeable, this can result in an air and water barrier article with different permeabilities in different zones. In these embodiments, the linered air and water barrier article according to the present disclosure is useful for the sill pan flashing of a window. It is desirable to have a non-permeable sill piece under the window and to have a permeable section of the tape to flash onto the vertical wall sections of the flashing. The non-permeable section offers the greatest protection in the sill, while the permeable section offers a way for moisture to get out in the event of a failed flashing installation. The elastic porous layer in the air and water barrier article allows it to have sufficient elongation to be able to stretch into the corner detail as a continuous sheet without seams and lay flat.

When the air and water barrier article according to the present disclosure is used as a sill tape, the width of the article is at least 10 centimeters and can be up to 30 centimeters. These widths allow the tape to be positioned in a window sill with the impermeable portion covering the sill and the permeable portion on the flashing.

In other applications, the air and water barrier article according to the present disclosure can have a wide variety of widths. In some embodiments, the width of the article is at least 1.9 centimeters or at least 2.5 centimeters. In some embodiments, the width of the article is at least 5 centimeters. In some embodiments, the width of the article is at most 10 centimeters. In some embodiments, the width of the article is up to 45 centimeters or up to 75 centimeters.

Method of Making Some Embodiments of Air and Water Barrier Articles

Figure 5:
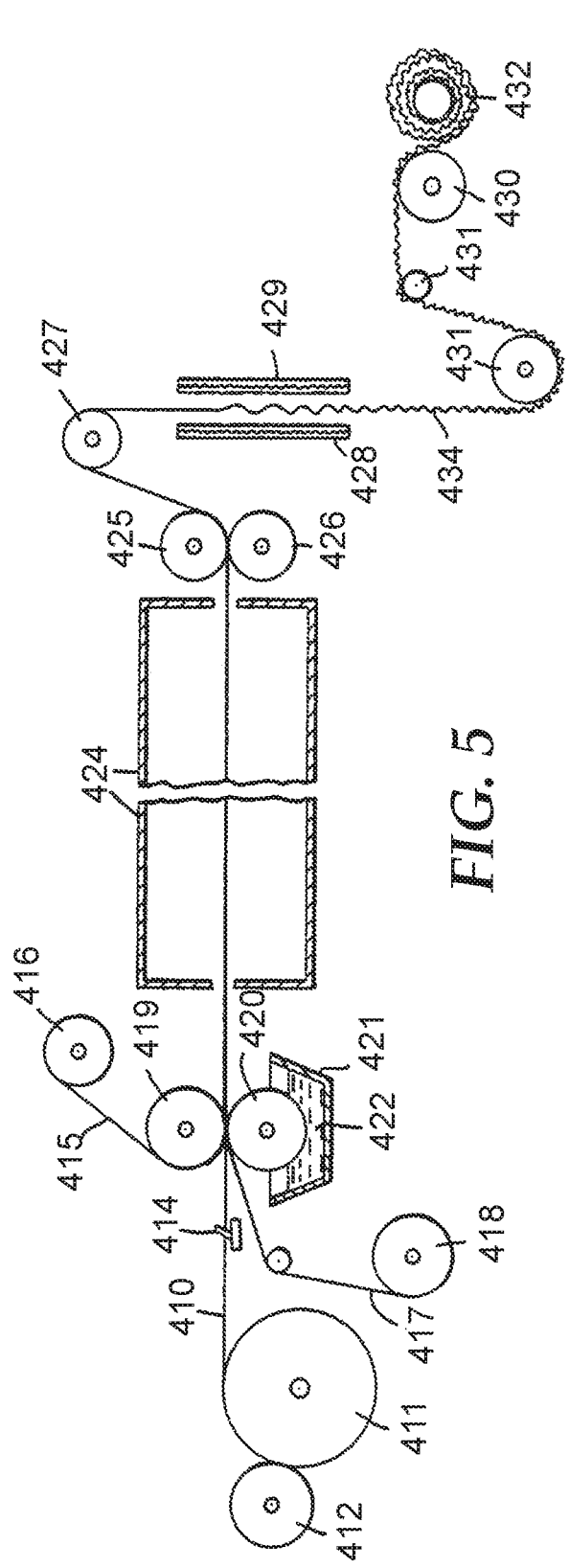
FIG. 5 is a schematic representation showing the manufacture of an elastic air and water barrier article according to some embodiments of the present disclosure.

In some embodiments, the presently disclosed air and water barrier articles can be made as described in U.S. Pat. No. 4,984,584 (Hansen et al.) using equipment as shown in FIG. 5. Elastomeric strands 410 from a beam 411 are unwound under tension controlled by driven press roll 412 and through comb 414. A first porous layer 415, having a polymeric layer disposed thereon along, with a second porous layer 417, from supply drums 416 and 418, respectively, or directly from the forming machine, if desired, are brought into contact with the elastomeric strands and with each other between rubber-covered squeeze roll 419 and knurled steel squeeze roll 420, the latter dipping into a pan 421 containing a fluid binder mixture 422 and depositing the binder mixture throughout the second porous layer 417. The composite web passes directly into a drying oven 424 and thence between pull drums 425 and 426. The web next passes around roll 427, between heating platens 428 and 429, around idler rolls 431 and surface winder roll 430, and is wound up to form stock roll 432.

Figure 6:
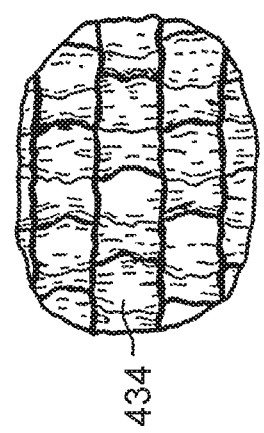
FIG. 6 is a representation in plan view of a portion of an air and water barrier article according to the present disclosure.

Squeeze rolls 419 and 420 rotate at a considerably greater surface speed than beam 411, and the elastomeric strands 410 are accordingly stretched a corresponding amount. This stretch is maintained by operating pull drums 425 and 426 and turn-around drum 427 at approximately the same speed compared with rollers 419 and 420. Surface winder roll 430 and wind-up drum 432, however, are again operated at a slower speed to permit shrinkage of the web as it passes between the heater platens 428 and 429. The composite web 434, which is smooth as it reaches the roll 427, becomes increasingly puckered, crimped or shirred as it passes through the heating zone, the result being further indicated in FIG. 6.

The heat supplied by the platens 428 and 429 is sufficient to cause considerable fuming of the sheet material and to relax the structure sufficiently to permit the elastomeric strands to retract and produce the desired degree of puckering, crimping or shining as controlled by the speed of the surface winder roll. The temperature may be regulated by adjusting both the energy input to the platens and the distance between the platens and the web. The duration of the heat treatment may be regulated, for a given length of platen, by adjusting the speed of travel of the web, sufficient time being provided to permit retraction of the web to the desired degree. The platens are maintained at a temperature sufficient to keep the web taut during the shrinking operation between rolls 427 and 430 at the speed indicated but not so high as to cause deterioration of the web as evidenced by excessive fuming and discoloration thereof. The shined or crimped product is dimensionally stable, the heat treatment serving to provide an effective degree of heat-setting or stabilizing, and neither shrinks nor expands when allowed to stand at normal temperatures and under no external stress; and it returns to such dimensions when first stretched and then permitted to retract.

In some embodiments concentrated natural rubber latex or synthetic rubber latex can be used as the fluid binder mixture. Other elastomers or blends of elastomers having similar properties may be used.

In some embodiments, instead of using a fluid binder mixture, a hot melt adhesive can be otherwise disposed between the elastomeric strands and the second porous layer and between the elastomeric strands and the first porous layer.

Following are embodiments and combinations of embodiments according to the present disclosure:

Embodiment 1

An article comprising:
a polymeric layer disposed on and covering a first major surface of an elastic porous layer, wherein the polymeric layer and the elastic porous layer together form an air and water barrier that is water vapor permeable;
an adhesive layer disposed on a second major surface of the elastic porous layer opposite the polymeric layer; and
a liner disposed on a major surface of the polymeric layer opposite the first major surface of the elastic porous layer, wherein the liner is water vapor impermeable.

Embodiment 2

The article of embodiment 1, further comprising a coating composition disposed between at least a portion of the polymeric layer and the liner, wherein the coating composition has a first peel adhesion to the liner that is lower than a second peel adhesion between the polymeric layer and the liner.

Embodiment 3

The article of embodiment 2, wherein the second peel adhesion is at least 15 N/dm.

Embodiment 4

The article of embodiment 2 or 3, wherein the liner is cut at a location corresponding to an edge of the coating composition.

Embodiment 5

The article of embodiment 2 or 3, wherein the liner does not cover the coating composition.

Embodiment 6

An article comprising:
a polymeric layer disposed on and covering a first major surface of an elastic porous layer, wherein the polymeric layer and the elastic porous layer together form an air and water barrier that is water vapor permeable;
an adhesive layer disposed on a second major surface of the elastic porous layer opposite the polymeric layer; and
a liner disposed on a major surface of the polymeric layer opposite the first major surface of the elastic porous layer, wherein the liner is water vapor impermeable and covers only a portion of the major surface of the polymeric layer.

Embodiment 7

The article of any one of embodiments 1 to 6, wherein the article passes at least one of Modified Test 1 of ASTM D-1970/D-1970M-13, Modified Test 2 of ASTM D-1970/D-1970M-13, or Modified Test 3 of ASTM D-1970/D-1970M-13.

Embodiment 8

The article of any one of the preceding embodiments, wherein a portion of the air and water barrier not covered by the liner has a vapor transmission rate of greater than or equal to 1 perms.

Embodiment 9

The article of any one of the preceding embodiments, wherein the elastic porous layer comprises at least one of a plurality of elastomeric strands, elastic net, elastic nonwoven material, elastic woven fabric, elastic knitted fabric, elastic foam, elastic microperforated film, and combinations thereof.

Embodiment 10

The article of any one of the preceding embodiments, wherein the article has an elongation of at least 90% in at least one direction.

Embodiment 11

The article of any one of the preceding embodiments, wherein the polymeric layer comprises a polyoxyalkylene polymer having at least one end group derived from an alkoxy silane.

Embodiment 12

The article of embodiment 11, wherein all of the end groups of the polyoxyalkylene polymer are silyl terminated.

Embodiment 13

The article of any one of the preceding embodiments, wherein the elastic porous layer comprises at least one of polyester, polylactic acid, polyolefin, polyamide, polyurethane, or rayon.

Embodiment 14

The article of any one of the preceding embodiments, wherein the elastic porous layer is a nonwoven comprising at least one of polyester, polylactic acid, polyolefin, polyamide, polyurethane, or rayon.

Embodiment 15

The article of any of embodiments 1 to 14 wherein the elastic porous layer is a selected from an extruded netting, a scrim, and combinations thereof.

Embodiment 16

The article of any of embodiments 1 to 15 wherein the elastic porous layer comprises a woven material.

Embodiment 17

The article of any of embodiments 1 to 16 wherein the elastic porous layer comprises blown microfibers.

Embodiment 18

The article of any of embodiments 1 to 17 wherein the elastic porous layer has a water strike through time of less than 400 seconds.

Embodiment 19

The article of any of the preceding embodiments wherein the article has an elongation of at least 105% in air least one direction.

Embodiment 20

The article of embodiment 11 or 12 wherein the polyoxyalkylene polymer further comprises at least one silyl modified branched group.

Embodiment 21

A method of applying an air and water barrier article, the method comprising:
adhering at least a portion of the adhesive layer on a roll of the article of any one of embodiments 1 to 20 to a surface of a building component, so that the article is affixed to the surface of the building component;
unwinding at least a portion of the roll, wherein during the unwinding, the liner remains disposed on the major surface of the polymeric layer opposite the first major surface of the elastic porous layer; and,
peeling at least a portion of the liner away from a portion of the article.

Embodiment 22

The method of embodiment 21, further comprising leaving a portion of the liner disposed on the major surface of the polymer layer.

Embodiments of the present disclosure have been described above and are further illustrated below by way of the following Examples, which are not to be construed in any way as imposing limitations upon the scope of the present disclosure. On the contrary, it is to be clearly understood that resort may be had to various other embodiments, modifications, and equivalents thereof which, after reading the description herein, may suggest themselves to those skilled in the art without departing from the spirit of the present disclosure and/or the scope of the appended claims.

EXAMPLES

The following examples are intended to illustrate exemplary embodiments within the scope of this disclosure. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

Materials

| | |
|---|---|
| KANEKA MS POLYMER S203H | A liquid, silyl-terminated polyether derived from a polyether polymer backbone and having methyldimethoxysilane functional groups and a viscosity of 6000 to 10,000 centiPoise, available under the trade designation KANEKA MS POLYMER S203H from Kaneka North America, LLC, Pasadena, TX. |
| AEROSIL R202 | A hydrophobic fumed silica after treated with a polydimethylsiloxane, available under the trade designation AEROSIL R202 from Evonik Corporation, Parsippany, NJ. |
| OMYACARB 5-FL | A beneficiated calcium carbonate having a mean particle size of 6.3 micrometers and a calcium carbonate content of 98%, available under the trade designation OMYACARB 5-FL from Omya Incorporated, Cincinnati, OH. |
| TIONA 696 | A non-chalking, chlorie-process rutile titanium dioxide pigment having a titanium dioxide content of 92%, and a surface treatment of alumina, silica, organic, available under the trade designation TIONA 696 from Cristal, Hunt Valley, MD. |
| DYNASYLAN DAMO-T | A liquid, bifunctional organosilane having two reactive amino groups and hydrolyzable inorganic methoxysilyl groups, available under the trade designation DYNASYLAN DAMO-T from Evonik Corporation, Parsippany, NJ. |
| DYNASYLAN VTMO | A liquid, bifunctional organosilane having a reactive vinyl group and a hydrolyzable inorganic trimethoxysilyl group, available under the trade designation DYNASYLAN VTMO from Evonik Corporation, Parsippany, NJ. |
| NEOSTAN U-220H | A liquid catalyst based on dibutyl tin bis(acetylacetoacetonate) having a tin content of 27.5%, available under the trade designation NEOSTAN U-220H from Nitto Kasei Company, Ltd., Osaka, Japan. |
| IOA | isooctyl acrylate |
| AA | acrylic acid |
| IRGACURE 651 | 2-dimethoxy-2-phenylacetophenone, a photoinitiator available under the trade designation IRGACURE 651 from available from BASF Corporation, Florham Park, NJ. |
| FORAL 85LB | A glycerol ester of highly hydrogenated wood rosin, available under the trade designation FORAL 85LB from Pinova Incorporated, Brunswick GA. |
| Triazine | 2,6-bis-trichoromethyl-6-(3,4-dimethoxyphenyl)-s-triazine |
| CLOPAY BR-134U | A white, microporous, breathable film having an embossed pattern thereon, an areal weight of 19 grams/square meter, and a moisture vapor transmission rate of (7500 grams H2O/day), believed to be mixture of a greater amount of linear low density polyethylene and a lesser amount of low density polyethylene, the mixture being modified with calcium carbonate and a styrene triblock polymer, available under the trade designation CLOPAY BR-134U White Breathable Film from Clopay Plastic Products Company, Mason, OH. |
| LINER 1 | A 51 micrometer (0.002 inch) thick, polyester film having a silicone treatment on both sides, available as 2.0 CL PET U4162/U4162 from Loparex, Hammond, WI. |
| UCON 50-HB-400 | A monobutyl ether of a linear polymer of ethylene oxide:propylene oxide (1:1) polyglcyol, having a number average molecular weight (Mn) of approximately 1230 and a viscosity index (VI) of 220 (ASTM D2270, IP 226), available under the trade designation UCON LUBRICANT 50-HB-400 from Dow Chemical Company, Midland, MI. |
| 2CEA | 2-Carboxyethyl acrylate (beta-carboxyethyl acrylate), a slightly viscous liquid containing 30-35 wt % of 2-carboxyethyl acrylate, 50-60 wt % of acrylic acid oligomers, and 10-20 wt % of acrylic acid, having an acid number of 6.4 milliequivalents/gram, available from Bimax Incorporated, Glen Rock, PA. |

| | |
|---|---|
| REEMAY 2024 | A spunbond polyester fabric having an areal weight of 71.4 grams/square meter, a thickness of 0.31 millimeters, and a TEXTEST Air Perm of (1626 liters/second)/square meter (320 cubic feet/minute)/square foot), available under the trade designation REEMAY 2024 from Fiberweb Filtration Business, Old Hickory, TN. |
| MPG S000695142 | An elastic material containing 91% Polyester and 9% SPANDEX woven fabric, having an areal weight of 116 grams/square meter, available as MPG S000695142 from Milliken & Company, Spartanburg, SC. |
| FOAM 1 | A foam sample was obtained by cutting a foam piece from a 90612 3M TEGADERM Foam Adhesive Dressing (3M Company, St. Paul, Minn.) such that the foam piece freely separated from all other parts of the dressing. |
| FOAM 2 | A foam having a density between 0.028 and 0.034 grams/cubic centimeter (1.75 and 2.10 pounds/cubic foot), a minimum elongation of 90%, and a minimum tensile strength of 110 KiloPascals (16.0 pounds/square inch), available as #6 in Foam Kit from Rogers Foam Corporation, Somerville, MA. |
| FOAM 3 | A foam having a density between 0.027 and 0.034 grams/cubic centimeter (1.7 and 2.1 pounds/cubic foot), a minimum elongation of 240%, and a minimum tensile strength of 207 KiloPascals (30 pounds/square inch), available as #26B in Foam Kit from Rogers Foam Corporation, Somerville, MA. |
| FINON C3019NW | A white, pattern spunbonded, nonwoven fiber of 100% polyester containing no chemical binder and having an areal weight of 18.6 grams/square meter (0.55 ounces/square yard), a product of Kolon Industries, Incorporated, Korea and available under the trade designation FINON C3019NW from Midwest Filtration LLC, Cincinnati, OH. |
| SONTARA 8005 | A white, spunlace polyester nonwoven having an areal weight of 67.8 grams/square meter and a thickness of 0.51 millimeters (0.020 inches), available under the trade designation SONTARA Style 8005 from Sontara America, Incorporated, Candler, NC. |
| Spray Adhesive | A synthetic elastomer-based, high strength, fast contact-type spray adhesive, available as Hi-Strength 90 Spray Adhesive from 3M Company, St. Paul, MN. |
| Elastomeric Strands | Chlorine resistant elastic fibers having an elongation at break of greater than 550% and a denier of 210, available under the trade designation RADICISPANDEX TYPE S17-B from RadiciSpandex Corporation, Gastonia, NC. |
| LINER 2 | A 51 micrometer (0.002 inch) thick untreated polyester film. |
| LINER 3 | A 77 micrometers (0.003 inches) thick, polyolefin-coated polyester core with silicone treatment on one side, available under the trade designation 48# CL PET H/H UE1095/000 from Loparex, Hammond, WI. |
| LINER 4 | An 89 micrometers (0.0035 inches) thick, cast polypropylene film having one glossy side and one matte side. |
| LINER 5 | A polyester film having a thickness of 36 micrometers (0.0014 inches) and having a polyolefin primer on one side and silicone treatment on the opposite side, available under the trade designation 2PAKN from Mitsubishi Polyester Film, Incorporated, Greer, SC. |
| LINER 6 | LINER 3 was coated on the non-siliconized side according to Synthesis Example 1 of US 2013/0004749 A1, except that a gravure coater was used in place of a Meyer bar. |
| Ink 1 | A liquid, white ink, available under the trade designation DT OPAQUE WHITE from Sun Chemical Corporation, Carlstadt, NJ. |
| GENIOSIL XL 65 | A liquid, alkoxysilane having an O-methyl carbamate organofunctional group, N-Dimethoxy(methyl)silylmethyl-O-methyl-carbamate, having utility as a water scavenging compound, available under the trade designation GENIOSIL XL 65 from Wacker Chemie AG, Munchen, Germany. |

Test Methods

Nail Sealability

Nail sealability of air and water barrier articles was evaluated generally as described in ASTM D-1970/D-1970M-13: "Standard Specification for Self-Adhering Polymer Modified Bituminous Sheet Materials Used as Steep Roofing Underlayment for Ice Dam Protection", Paragraph 7.9: "Self Sealability. Head of Water Test" with some modifications. All materials were conditioned at (23° C. (73° F.)) for at least 24 hours prior to use. Three different modified tests were employed. Samples were considered to have passed the test if a rating of "A" or "B" was achieved.

Modified Test 1 of ASTM D-1970/D-1970M-13

A plywood substrate having a thickness of 1.25 cm (0.5 inches) was employed; four nails were driven through the air and water barrier article into the plywood substrate until 6.35 millimeters (0.25 inches) remained above the exposed surface of the air and water barrier article; and a red dye was added to the water. After exposure the surface of plywood substrate in contact with the air and water barrier article (referred to herein as the "topside"), and the surface of the plywood substrate opposite the topside (referred to herein as the "bottomside") were inspected visually by unaided eye for signs of water leakage as determined by the presence of red-stained areas around each of the four nails. Such stained areas would be indicative of failure of the air and water barrier article to form a seal around the nails. Samples were rated "A" if 3 or 4 of the nail areas on the plywood substrate were free of dye staining; "B" if 2 of the nail areas on the plywood substrate were free of dye staining; and "C" if 1 or 0 of the nail areas on the plywood substrate were free of dye staining.

Modified Test 2 of ASTM D-1970/D-1970M-13

Modified Test 2 was conducted in the same manner as Modified Test 1 with the following change. The four nails were driven through the air barrier article into the plywood substrate until the nail head contacted the top surface of the air and water barrier article, then the nail was backed out until 6.35 millimeters (0.25 inches) remained above the exposed surface of the air and water barrier article.

Modified Test 3 of ASTM D-1970/D-1970M-13

Modified Test 3 was conducted in the same manner as Modified Test 2 with the following modification. The nails were not backed out.

Moisture Vapor Transmission Rate

The moisture vapor transmission rates of air and water barrier articles were evaluated generally as described in ASTM E96/E96M-13: "Standard Test Methods for Water Vapor Transmission of Materials" using Paragraph 11: Dessicant Method at (23° C. (73° F.)) and 50% relative humidity, with the following modifications. Six data points were obtained and used to calculate a permeance value. The six individual values were used to determine an average permeance value which was reported in units of Perms.

180° Angle Peel Adhesion Test 1 (Easy Side Release=Adhesive Strength)

The 180 degree angle peel adhesion strength between the liner and pattern coated pressure sensitive adhesive, also referred to herein as the "easy side release", was measured on a laminate of liner/pattern coated pressure sensitive adhesive/porous layer. Adhesive strength was measured after aging for seven days at 23° C. and 50% relative humidity. A 2.54 centimeter wide by approximately 20 centimeter (1 inch by 8 inch) long sample of the laminate was cut using a specimen razor cutter. The exposed liner surface was attached lengthwise to the previously cleaned aluminum platen surface of a peel adhesion tester (Model SP3M90, IMASS Incorporated, Accord, Mass.). The laminate was then rolled down one time in one direction with a 2 kilograms (4.4 pounds) rubber roller at a rate of 230 centimeters/minute (90 inches/minute). The pressure sensitive adhesive/porous layer was carefully lifted away from the liner adhered to the platen surface, doubled-back at an angle of 180 degrees, and secured to the clamp of the peel adhesion tester. The 180 degree angle peel adhesion strength was then measured as the pressure sensitive adhesive/porous layer was peeled from the liner at a rate of 230 centimeters/minute (90 inches/minute). A minimum of two test specimens were evaluated with results obtained in ounces/inch which were used to calculate the average release strength. Release testing was conducted under Condition A described in 180° Angle Peel Adhesion Test 2 (Tight Side Release=Liner Release) below.

180° Angle Peel Adhesion Test 2 (Tight Side Release=Liner Release)

The 180 degree angle peel adhesion strength between the liner and polymeric material, also referred to herein as the "tight side release", was measured on a laminate of liner/polymeric material/porous layer. The same procedure as described for "180° Angle Peel Adhesion Test 1 (Easy Side Release=Adhesive Strength)" was used with the following modification. The polymeric material/porous layer was carefully lifted away from the liner adhered to the platen surface, doubled-back at an angle of 180 degrees, and secured to the clamp of the peel adhesion tester. The 180 degree peel adhesion strength between the liner and polymeric material was measured after all aging conditions (A, B, and C) given below.

A) After 7 days at 23° C. (73° F.) and 50% relative humidity (RH);

B) After 7 days at 70° C. (158° F.) followed by equilibration for 4 hours at 23° C./50% RH;

C) After 7 days at 32° C. (90° F.) followed by equilibration for 4 hours at 23° C./50% RH.

In some instances the adhesion between the liner and the polymeric material and/or the adhesion between the polymeric material and the porous layer was greater than the internal (cohesive) strength of the polymeric material. This resulted in splitting of the polymeric material, and was reported as "Cohesive Failure".

Elongation

Tensile properties of coated air barrier articles were evaluated generally as described in ASTM D882-12: "Standard Test Method for Tensile Properties of Thin Plastic Sheeting" with the following modifications. Three straight section specimens measuring 12.5 mm (0.5 inches) wide, 152 millimeters (6 inches) long, and having a thickness generally between approximately 0.15 and 0.76 millimeters (0.006 to 0.030 inches) were cut from film samples in the downweb (DW; also referred to as the machine direction (MD)) and crossweb (CW) directions and conditioned for a minimum of 24 hours at 23+/−2° C. and 50% relative humitdity+/−5% prior to testing. The separation distance between parallel grips was 100 mm (4 inches), the crosshead speed was 51 millimeters/minute (2 inches/minute). The separation rate, force measurements, and data calculations were carried out by the system controller. The average of two test samples was reported.

Stress Relaxation

Stress Relaxation properties of coated air barrier articles were evaluated as follows. Samples were conditioned for a minimum of 24 hours at 23+/−2° C. and 50% relative humidity+/−5% prior to testing. A straight section specimen measuring 25.4 millimeters (1 inch) wide, by 152 millimeters (6 inches) long was cut in the machine direction (MD). The sample was inserted with no slack or stretch into the grips of a tensile machine (Model Sintech 500/s, MTS Systems Corporation, Eden Prairie, Minn.) with an initial separation distance between parallel grips of 100 millimeters (4 inches). The sample was elongated at a crosshead speed of 1520 millimeters/minute (60 inches/min) until it reached 50% elongation. This position was held for 5 minutes. The crosshead then returned to 0% elongation, completing the cycle. The separation rate, force measurements, and data calculations were carried out by the system controller. The initial load at 50% elongation and the load after 5 minutes at 50% elongation were recorded. The stress relaxation was calculated as (1−(load after 5 minutes/initial load))*100 and reported in %. The load values were reported in pounds force (lbf) and Newtons (N).

Water Strike Through

The moisture dissipation capability of the polymeric coated porous layer was characterized according to WSP 70.3 (08)—"Standard Test Method for Nonwoven Coverstock Liquid Strike-Through Time Using Simulated Urine"

with the following modifications. No absorbent pad was put under the test specimen. The samples were all tested on the porous layer opposite the polymeric coating. Instead of using 5 mL of simulated urine, 3 milliliters of distilled water was used. A plate measuring 101.6 millimeters (4 inches)× 101.6 millimeters (4 inches)×25.4 millimeters (1 inch) thick was placed on top of the specimen. The water was placed into a cylinder cut through the plate with a diameter of 25.4 millimeter (1 inch). A stopwatch was used instead of an electronic timer. The stopwatch was started as soon as the water contacted the porous layer, and was stopped once the water had completely penetrated into the porous layer. The time for the 3 milliliters of water to completely penetrate into the porous layer was recorded in seconds and reported as the Strike Through Time of the polymeric coated porous layer.

Water Absorption Capacity

The absorption capacity of the polymeric coated porous layer was determined as follows. A 107.95 millimeters (4.25 inches)×107.95 millimeters (4.25 inches) sample was weighed and then placed in to a bath of water for 5 minutes. The material was then taken out of the bath and hung by a clip for 1 minute. The material was then reweighed to determine the weight of the water absorbed in grams. The Water Absorbance Capacity was calculated by subtracting the initial weight of the material from the final weight after soaking. The absorption values were reported in grams

EXAMPLES

Example 1

An air and water barrier article having an elastic porous layer partially impregnated and covered on one side with a polymeric material and having a pressure sensitive adhesive layer disposed on the side of the elastic porous layer opposite that coated with the polymeric material was prepared as follows. The polymeric material composition was provided by charging the following materials into a mixing vessel which was then placed in a dual asymmetric centrifuge mixer: 39.8 parts by weight (hereinafter abbreviated as "pbw") of a silyl-terminated polyether, KANEKA MS POLYMER 5203H, 1.25 pbw of hydrophobic fumed silica, AEROSIL R202, 26.7 pbw of calcium carbonate OMYAC-ARB 5-FL, and 4.4 pbw of titanium oxide, TIONA 696. After mixing at 2500 rpm for four minutes 0.87 pbw of an aminosilane, DYNASYLAN DAMO-T, 0.87 pbw of a vinyl trimethoxysilane, DYNASYLAN VTMO, and 0.19 pbw of a tin catalyst, NEOSTANN U-220H, were added and mixed at 2500 rpm for two minutes. This final mixture was used to coat LINER 1 using a notch bar coater having a gap setting that was 0.30 millimeters (0.012 inches) greater than the thickness of the release film. The polymeric material-coated release film was then laminated to an elastic porous layer, FOAM 1, at room temperature (23° C. (73° F.)) using a hand roller and light pressure. This laminate construction was cured at 93° C. (200° F.) for 8 hours. This gave a self-sealing air and water barrier article (continuous layer of polymeric material on one side of the elastic porous layer) having a liner on the side of the polymeric coating opposite that of the elastic porous layer.

A pressure sensitive adhesive precursor composition was prepared by mixing 99 parts pbw isooctyl acrylate (IOA), 1 pbw acrylic acid (AA) and 0.04 pbw of a photoinitiator, IRGACURE 651. This mixture was partially polymerized under a nitrogen atmosphere by exposure to low intensity ultraviolet radiation to provide a coatable syrup having a viscosity of about 4000 cps. An additional 0.26 pbw of IRGACURE 651, 0.13 pbw of a Triazine, and 6 pbw of a tackifier, FORAL 85LB, were added to the syrup and mixed until all of the components had completely dissolved to give a pressure sensitive adhesive precursor composition.

The adhesive precursor composition was then coated onto a siliconized polyethylene coated Kraft paper liner using a notch bar with a 0.076 mm (0.003 inches) gap setting greater than the thickness of the liner. The adhesive precursor was then exposed to an ultraviolet radiation source having a spectral output from 300-400 nanometers with a maximum at 351 nanometers in a nitrogen-rich environment. An irradiance of about 9.0 milliWatts/square centimeter was used during the exposure time, resulting in a total energy of 1800 milliJoules/square centimeter. The result was a pressure sensitive adhesive coated liner.

For nail sealability evaluation the pressure sensitive adhesive was transfer laminated from the paper liner to a 12.7 millimeter (0.5 inch) thick piece of plywood substrate using hand pressure. Next, the self-sealing air and water barrier article was laminated by hand to the plywood substrate such that the exposed surface of the elastic porous layer covered the pressure sensitive adhesive layer. The liner attached to the polymeric coating was then removed. The plywood substrate having an adhesive coated, self-sealing air and water barrier article thereon was then evaluated for nail sealability using test method 1.

Measurement of moisture vapor transmission rates and tensile and elongation properties were conducted on the elastic self-sealing air and water barrier article (continuous layer of polymeric material on one side of the elastic porous layer) that resulted from removal of the liner from the polymeric coating prior to testing unless otherwise noted below.

"Tight Side Release" was measured on the construction of the elastic self-sealing air and water barrier article (continuous layer of polymeric material on one side of the elastic porous layer) having a liner on the side of the polymeric coating opposite that of the elastic porous layer.

Example 2

Example 1 was repeated with the following modifications. The elastic porous layer used was FOAM 2.

Example 3

Example 1 was repeated with the following modifications. The elastic porous layer used was FOAM 3.

Example 4

Example 1 was repeated with the following modifications. The elastic porous layer used was MPG S000695142. This construction was also tested for Stress Relaxation, Water Strike Through, and Water Absorption Capacity after LINER 1 was removed.

Comparative Example 1

Example 1 was repeated with the following modifications. A porous layer (REEMAY 2024) was used in place of the elastic porous layer, FOAM 1. This material was also tested for Water Strike Through.

Illustrative Example 5

A pressure sensitive adhesive precursor composition on a siliconized polyethylene coated Kraft paper liner was prepared as described in Example 1. REEMAY 2024 was then laminated using hand pressure to the exposed pressure sensitive adhesive. Next, the siliconized polyethylene coated Kraft paper liner was removed and replace with LINER 1. This construction was then tested for "Easy Side Release".

Example 6

Elastomeric Strands were cut to 29.5 centimeters (11.6 inches) in length. Three Elastomeric Strands were held together and the ends tied to two screws spaced 118 centimeters (46.5 inches) apart in a plywood board. This was repeated for 27 more sets of three Elastomeric Strands, with a spacing of 0.64 centimeters (0.25 inches) between the sets.

A porous layer, FINON C3019NW, having LINER 1 on one side was treated with Spray Adhesive on the side opposite that in contact with the LINER 1. The resulting adhesive treated porous layer with liner was then slid under the sets of Elastomeric Strands mounted on the plywood board. Next, the upper, exposed surface of the Elastomeric Strands was treated with Spray Adhesive.

A self-sealing air and water barrier article (continuous layer of polymeric material on one side of the elastic porous layer) was prepared as described in Example 1 and its LINER removed, with the following modification. A porous layer, FINON C3019NW, was used in place of the elastic porous layer FOAM 1. This self-sealing air and water barrier article was the laminated using hand pressure on top of the exposed, adhesive treated Elastomeric Strands. The multi-layered construction was allowed to dry at room temperature for about 24 hours.

The ends of the Elastomeric Strands were then cut from the plywood board, the LINER 1 was removed, and the resulting construction treated with a heat gun on high setting for a total of about five minutes to give an elastic self-sealing air and water barrier article.

For nail sealability evaluation a paper liner containing pressure sensitive adhesive prepared as described in Example 1 was transfer laminated using hand pressure to a 12.7 millimeter (0.5 inch) thick piece of plywood substrate. Next, the elastic self-sealing air and water barrier article was stretched until it was flat then laminated by hand to the plywood substrate such that the exposed surface of the porous layer covered the pressure sensitive adhesive layer. The plywood substrate having an adhesive coated, elastic self-sealing air and water barrier article thereon was then evaluated for nail sealability using test method 1.

Measurement of moisture vapor transmission rates and tensile and elongation properties were conducted on the elastic self-sealing air and water barrier article (continuous layer of polymeric material on one side of the elastic porous layer) that resulted from removal of the liner from the polymeric coating prior to testing.

Example 7

Example 1 was repeated with the following modifications. The elastic porous layer used was SONTARA 8005.

Illustrative Example 8

Comparative Example 1 was repeated with the following modifications. LINER 2 was used in place of LINER 1 and the liner was provided with a flood coating of INK 1 on one side using a #0 Meyer bar followed by drying at room temperature to provide 100% ink coverage of the liner. The polymeric material was then coated over the ink flood coat.

Example 9

Example 4 was repeated with the following modifications. LINER 2 was used in place of LINER 1. Nail sealability was tested on the article with the liner. Moisture Vapor Transmission Rate was measured on LINER 2 only and reported in Table 1, below. Combination with the elastic porous layer and polymeric layer is expected to decrease the Moisture Vapor Transmission Rate.

Illustrative Example 10

Comparative Example 1 was repeated with the following modifications. LINER 3 was used in place of LINER 1 and the liner was provided with a flood coating of INK 1 on one side using a #0 Meyer bar followed by drying at room temperature to provide 100% ink coverage of the liner. The polymeric material was then coated over the ink flood coat.

Example 11

Example 4 was repeated with the following modifications. LINER 3 was used in place of LINER 1. Nail sealability was tested on the article with the liner. Moisture Vapor Transmission Rate was measured on LINER 3 only and reported in Table 1, below. Combination with the elastic porous layer and polymeric layer is expected to decrease the Moisture Vapor Transmission Rate.

Example 12

Example 4 was repeated with the following modifications. LINER 4 was used in place of LINER 1 and the liner was provided with a flood coating of INK 1 on one side using a #0 Meyer bar followed by drying at room temperature to provide 100% ink coverage of the liner. The polymeric material was then coated over the ink flood coat.

Example 13

Example 4 was repeated with the following modifications. LINER 4 was used in place of LINER 1. Nail sealability was tested on the article with the liner. Moisture Vapor Transmission Rate was measured on LINER 4 only and reported in Table 1, below. Combination with the elastic porous layer and polymeric layer is expected to decrease the Moisture Vapor Transmission Rate.

Illustrative Example 14

Comparative Example 1 was repeated with the following modifications. LINER 5 was used in place of LINER 1 and the liner was provided with a flood coating of INK 1 on one side using a #0 Meyer bar followed by drying at room temperature to provide 100% ink coverage of the liner. The polymeric material was then coated over the ink flood coat.

Example 15

Example 4 was repeated with the following modifications. LINER 5 was used in place of LINER 1. Nail sealability was tested on the article with the liner. Moisture Vapor Transmission Rate was measured on LINER 5 only and reported in Table 1, below. Combination with the elastic porous layer and polymeric layer is expected to decrease the Moisture Vapor Transmission Rate.

Example 16

Example 4 was repeated with the following modifications. LINER 6 was used in place of LINER 1 and the liner was provided with a flood coating of INK 1 on one side using a #0 Meyer bar followed by drying at room temperature to provide 100% ink coverage of the liner. The polymeric material was then coated over the ink flood coat.

Example 17

Example 4 was repeated with the following modifications. LINER 6 was used in place of LINER 1. Nail sealability was tested on the article with the liner. Moisture Vapor Transmission Rate was measured on LINER 6 only and reported in Table 1, below. Combination with the elastic porous layer and polymeric layer is expected to decrease the Moisture Vapor Transmission Rate.

Example 18

Example 4 was repeated with the following modifications. 2.5 pbw of hydrophobic fumed silica, AEROSIL R202 were used instead of 1.25 pbw in the polymeric formulation, and LINER 3 was used in place of LINER 1. This sample was tested only for Stress Relaxation after LINER 3 was removed.

Example 19

Example 18 was repeated with the following modifications. 0.87 pbw of GENIOSIL XL 65 was used in place of DYNASYLAN VTMO. This construction was tested only for Stress Relaxation, Water Strike Through, and Water Absorption Capacity after LINER 3 was removed.

Comparative Example 2

Example 18 was repeated with the following modifications. REEMAY 2024 was used as the porous layer. This sample was tested for Water Strike Through and Water Absorption Capacity.

Results

TABLE 1

Nail Sealability (Test 1) and Moisture Vapor Transmission Rate

| Ex. No. | Nail Sealability Top Side Test 1 | Nail Sealability Bottom Side Test 1 | Moisture Vapor Transmission Rate Permeance (Perms) |
|---|---|---|---|
| 1 | A | A | 17.5 |
| 2 | A | A | ND |
| 3 | A | A | ND |
| 4 | A | A | 31.9 |
| CE 1 | A | A | 22.7 |
| 6 | A | A | 23.8 |
| 7 | A | A | 23.1 |
| 9 | A | A | Less than 0.85 |
| 11 | A | A | Less than 0.91 |
| 12 | A | A | 19.8 |
| 13 | B | A | Less than 0.72 |

TABLE 1-continued

Nail Sealability (Test 1) and Moisture Vapor Transmission Rate

| Ex. No. | Nail Sealability Top Side Test 1 | Nail Sealability Bottom Side Test 1 | Moisture Vapor Transmission Rate Permeance (Perms) |
|---|---|---|---|
| 15 | A | A | Less than 0.6 |
| 16 | A | A | 21.3 |
| 17 | A | A | Less than 0.4 |

Moisture Vapor Transmission Rate

CE: Comparative Example
ND: Not Determined

TABLE 2

180° Angle Peel Adhesion After 7 Days at 23° C./50% RH

| Ex. No. | Tight Side Release (oz/in, N/dm) | Easy Side Release (oz/in, N/dm) |
|---|---|---|
| 1 | 11.6 (12.7) | NA |
| CE 1 | 13.95 (15.3) | NA |
| 5 | NA | 0.9 (1.0) |
| 7 | 9.2 (10.1) | NA |
| 8 | 11.9 (13.0) | NA |
| 9 | Cohesive Failure | NA |
| 10 | 15.3 (16.7) | NA |
| 11 | Cohesive Failure | NA |
| 12 | 3.7 (4.1) | NA |
| 13 | Cohesive Failure | NA |
| 14 | 9.7 (10.6) | NA |
| 15 | Cohesive Failure | NA |
| 16 | 3.4 (3.8) | NA |
| 17 | 38.9 (42.6) | NA |

CE: Comparative Example
NA: not applicable

The results for Illustrative Example 5 in Table 2 are typical of the Easy Side Release values for all the examples where the same adhesive and liner are employed.

TABLE 3

180° Angle Peel Adhesion After 7 Days at 70° C.

| Ex. No. | Tight Side Release (oz/in, N/dm) |
|---|---|
| 1 | 17.2 (18.8) |
| CE 1 | Cohesive Failure |
| 7 | 16.1 (17.6) |
| 12 | 5.9 (6.6) |
| 16 | 3.3 (3.7) |

CE: Comparative Example

TABLE 4

180° Angle Peel Adhesion After 7 Days at 32° C./90% RH

| Ex. No. | Tight Side Release (oz/in, N/dm) |
|---|---|
| 1 | 15.0 (16.4) |
| CE 1 | 26.4 (28.9) |
| 7 | 8.1 (8.9) |

CE: Comparative Example

TABLE 5

Elongation

| Ex. No. | Web Direction (CD or MD) | Elongation (%) |
|---|---|---|
| 1 | MD | 111.4 |
| 4 | CD | 210.1 |
| CE 1 | MD | 39.7 |
| CE 1 | CD | 47.2 |
| 6 | MD | 109.9 |
| 7 | CD | 92.4 |

CE: Comparative Example

TABLE 6

Stress Relaxation

| Ex. No. | Web Direction (CD or MD) | Initial Load lbf (N) | Load after 5 minutes lbf (N) | Stress Relaxation (%) |
|---|---|---|---|---|
| 4 | MD | 6.0 (26.5) | 3.0 (13.1) | 50% |
| 18 | MD | 3.9 (17.4) | 2.3 (10.3) | 41% |
| 19 | MD | 1.7 (7.7) | 1.0 (4.5) | 41% |

TABLE 7

Water Strike Through

| Ex. No. | Strike Through Time (seconds) | Initial Weight (grams) | Final Weight (grams) | Absorbance Capacity (grams) |
|---|---|---|---|---|
| CE1 | 1620 | ND | ND | ND |
| 4 | 296 | 5.13 | 6.4176 | 1.29 |
| 19 | 47.6 | 6.3384* | 8.421* | 2.08 |
| CE 2 | 3300 | 3.9083 | 4.1999 | 0.2916 |

*Liner was not removed prior to testing.

While the specification has described in detail certain embodiments, it will be appreciated that those skilled in the art, upon attaining an understanding of the foregoing, may readily conceive of alterations to, variations of, and equivalents to these embodiments. Accordingly, it should be understood that this disclosure is not to be unduly limited to the illustrative embodiments set forth hereinabove. Furthermore, all published patent applications and issued patents referenced herein are incorporated by reference in their entirety to the same extent as if each individual publication or patent was specifically and individually indicated to be incorporated by reference. Various exemplary embodiments have been described. These and other embodiments are within the scope of the following listing of disclosed embodiments.

What is claimed is:

1. An article comprising:
   a polymeric layer disposed on and covering a first major surface of an elastic porous layer, wherein the polymeric layer and the elastic porous layer together form an air and water barrier that is water vapor permeable and has a water vapor transmission rate of greater than or equal to one perm;
   an adhesive layer disposed on a second major surface of the elastic porous layer opposite the polymeric layer; and
   a liner disposed on a major surface of the polymeric layer opposite the first major surface of the elastic porous layer, wherein the liner is water vapor impermeable.

2. The article of claim 1, further comprising a coating composition disposed between at least a portion of the polymeric layer and the liner, wherein the coating composition has a first peel adhesion to the liner that is lower than a second peel adhesion between the polymeric layer and the liner.

3. The article of claim 2, wherein the second peel adhesion is at least 15 N/dm.

4. The article of claim 2, wherein the coating composition is disposed between a portion of the polymeric layer and the liner, wherein the coating composition has an edge where it stops and does not extend an entire width of the article, wherein the liner has a cut at a location corresponding to the edge of the coating composition, and wherein the polymeric layer, the elastic porous layer, and the adhesive layer do not have a cut at the location corresponding to the edge of the coating composition.

5. An article comprising:
   a polymeric layer disposed on and covering a first major surface of an elastic porous layer, wherein the polymeric layer and the elastic porous layer together form an air and water barrier that is water vapor permeable;
   an adhesive layer disposed on a second major surface of the elastic porous layer opposite the polymeric layer; and
   a liner disposed on a major surface of the polymeric layer opposite the first major surface of the elastic porous layer, wherein the liner is a water vapor impermeable film or paper and covers only a portion of the major surface of the polymeric layer, and wherein a portion of the air and water barrier not covered by the liner has a water vapor transmission rate of greater than or equal to one perm.

6. The article of claim 5, wherein the article passes at least one of Modified Test 1 of ASTM D-1970/D-1970M-13, Modified Test 2 of ASTM D-1970/D-1970M-13, or Modified Test 3 of ASTM D-1970/D-1970M-13.

7. The article of claim 5, wherein the elastic porous layer comprises at least one of a plurality of elastomeric strands, elastic net, elastic nonwoven material, elastic woven fabric, elastic knitted fabric, elastic foam, or elastic microperforated film.

8. The article of claim 5, wherein the air and water barrier has an elongation of at least 90% in at least one direction.

9. The article of claim 5, wherein the polymeric layer comprises a polyoxyalkylene polymer having at least one end group derived from an alkoxy silane.

10. The article of claim 9, wherein all of the end groups of the polyoxyalkylene polymer are silyl terminated.

11. The article of claim 5, wherein the elastic porous layer comprises at least one of polyester, polylactic acid, polyolefin, polyamide, polyurethane, or rayon.

12. A method of applying an air and water barrier article, the method comprising:
   adhering at least a portion of the adhesive layer on a roll of the article of claim 1 to a surface of a building component, so that the article is affixed to the surface of the building component;
   unwinding at least a portion of the roll, wherein during the unwinding, the liner remains disposed on the major surface of the polymeric layer opposite the first major surface of the elastic porous layer; and,
   peeling at least a portion of the liner away from a portion of the article.

13. The method of claim 12, further comprising leaving a portion of the liner disposed on the major surface of the polymer layer.

14. The article of claim 4, wherein the elastic porous layer comprises at least one of a plurality of elastomeric strands, elastic net, elastic nonwoven material, elastic woven fabric, elastic knitted fabric, elastic foam, or elastic microperforated film.

15. The article of claim 4, wherein the air and water barrier has an elongation of at least 90% in at least one direction.

16. The article of claim 4, wherein the polymeric layer comprises a polyoxyalkylene polymer having at least one end group derived from an alkoxy silane.

17. The article of claim 16, wherein all of the end groups of the polyoxyalkylene polymer are silyl terminated.

18. The article of claim 4, wherein the elastic porous layer comprises at least one of polyester, polylactic acid, polyolefin, polyamide, polyurethane, or rayon.

19. The article of claim 4, wherein the elastic porous layer comprises at least one of a plurality of elastomeric strands, elastic net, elastic nonwoven material, elastic woven fabric, elastic knitted fabric, or elastic microperforated film.

20. The article of claim 5, wherein the elastic porous layer comprises at least one of a plurality of elastomeric strands, elastic net, elastic nonwoven material, elastic woven fabric, elastic knitted fabric, or elastic microperforated film.

* * * * *